United States Patent
Smith

(10) Patent No.: US 10,531,526 B2
(45) Date of Patent: *Jan. 7, 2020

(54) SOLID STATE MICROWAVE HEATING APPARATUS WITH DIELECTRIC RESONATOR ANTENNA ARRAY, AND METHODS OF OPERATION AND MANUFACTURE

(71) Applicant: Freescale Semiconductor, Inc., Austin, TX (US)

(72) Inventor: James Smith, Mesa, AZ (US)

(73) Assignee: NXP USA, Inc., Austin, TX (US)

( * ) Notice: Subject to any disclaimer, the term of this patent is extended or adjusted under 35 U.S.C. 154(b) by 666 days.

This patent is subject to a terminal disclaimer.

(21) Appl. No.: 15/199,709

(22) Filed: Jun. 30, 2016

(65) Prior Publication Data

US 2018/0007746 A1    Jan. 4, 2018

(51) Int. Cl.
*H05B 6/72* (2006.01)
*H05B 6/68* (2006.01)
(Continued)

(52) U.S. Cl.
CPC ............... *H05B 6/72* (2013.01); *H05B 6/662* (2013.01); *H05B 6/686* (2013.01); *H05B 6/70* (2013.01); *Y02B 40/143* (2013.01)

(58) Field of Classification Search
CPC ............. H05B 6/72; H05B 6/662; H05B 6/70
(Continued)

(56) References Cited

U.S. PATENT DOCUMENTS 4,121,078 A    10/1978   Takano et al.
5,453,754 A *  9/1995   Fray ..................... H01Q 9/0485
                                                 343/700 MS
(Continued)

FOREIGN PATENT DOCUMENTS

DE        4240104 A1     6/1994
EP        1232538 B1    11/2008
(Continued)

OTHER PUBLICATIONS

Arlon Microwave Materials, AR1000 PTFE/Woven Fiberglass Ceramic Filled High Er Laminates, 4 pgs. (Feb. 2005).
(Continued)

*Primary Examiner* — Thien S Tran
(74) *Attorney, Agent, or Firm* — Sherry W. Schumm

(57) ABSTRACT

An embodiment of a microwave heating apparatus includes a solid state microwave energy source, a chamber, a dielectric resonator antenna with an exciter dielectric resonator and a feed structure, and one or more additional dielectric resonators each positioned within a distance of the exciter resonator to form a dielectric resonator antenna array. The distance is selected so that each additional resonator is closely capacitively coupled with the exciter resonator. The feed structure receives an excitation signal from the microwave energy source. The exciter resonator is configured to produce a first electric field in response to the excitation signal, and the first electric field may directly impinge on the additional resonator(s). Impingement of the first electric field may cause each of the additional resonators to produce a second electric field. The electric fields are directed into the chamber to increase the thermal energy of a load within the chamber.

32 Claims, 13 Drawing Sheets

(51) Int. Cl.
  *H05B 6/66* (2006.01)
  *H05B 6/70* (2006.01)

(58) Field of Classification Search
  USPC .................................................. 219/716, 717
  See application file for complete search history.

(56) References Cited

U.S. PATENT DOCUMENTS

| | | | |
|---|---|---|---|
| 6,093,921 | A | 7/2000 | Gaisford et al. |
| 6,150,907 | A * | 11/2000 | Loi .......................... H01P 1/207 |
| | | | 333/212 |
| 6,452,565 | B1 | 9/2002 | Kingsley et al. |
| 2003/0106891 | A1 | 6/2003 | Fagrell et al. |
| 2004/0051602 | A1 | 3/2004 | Pance et al. |
| 2005/0162316 | A1 | 7/2005 | Thomas et al. |
| 2005/0225499 | A1 | 10/2005 | Kingsley et al. |
| 2006/0081624 | A1 * | 4/2006 | Takada .............. H01J 37/32192 |
| | | | 219/716 |
| 2006/0244668 | A1 * | 11/2006 | Iellici ................... H01Q 9/0485 |
| | | | 343/729 |
| 2007/0115080 | A1 * | 5/2007 | Pance ................... H01P 1/2084 |
| | | | 333/202 |
| 2008/0042903 | A1 * | 2/2008 | Cheng ................. H01Q 9/0485 |
| | | | 343/700 MS |
| 2008/0111550 | A1 | 5/2008 | Freytag |
| 2011/0234010 | A1 * | 9/2011 | Bohori .................... H02J 5/005 |
| | | | 307/104 |
| 2013/0063158 | A1 | 3/2013 | Potrepka et al. |
| 2013/0175262 | A1 | 7/2013 | Gharpurey et al. |
| 2013/0278345 | A1 | 10/2013 | Shi et al. |

FOREIGN PATENT DOCUMENTS

| | | |
|---|---|---|
| FR | 2 310 058 A1 | 11/1976 |
| GB | 2 355 855 A | 5/2001 |
| GB | 2 391 154 A | 1/2004 |
| GB | 2391154 A * | 1/2004 |
| JP | 57-130395 A | 8/1982 |
| WO | 03/034790 A2 | 4/2003 |
| WO | 2004010740 A1 | 1/2004 |

OTHER PUBLICATIONS

Liang, E.C. "An Overview of High Q TE Mode Dielectric Resonators and Applications", Microwave Journal, 4 pgs. (Feb. 2015).
Kingsley, S.P. et al. "Beam steering and monopulse processing of probe-fed dielectric resonator antennas", IEE Proceedings—Radar, Sonar and Navigation, vol. 146, No. 3, pp. 121-125 (Jun. 1999).
Non Final Office Action dated Oct. 19, 2018 for U.S. Appl. No. 15/199,656 59 pgs.
Final Office Action; U.S. Appl. No. 15/199,656; 64 pages (dated Apr. 25, 2019).
Keyrouz, S. et al; "Dielectric Resonator Antennas: Basic Concepts, Design Guidelines, and Recent Developments at Millimeter-Wave Frequencies"; International J. of Antennas and Propagation, vol. 2016, Article 6075680; Hindawi Publishing Corp; 20 pages (Sep. 22, 2016).

* cited by examiner

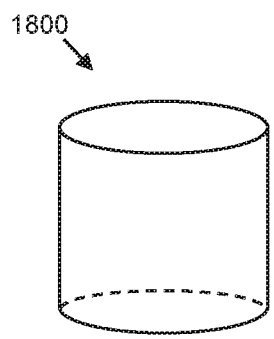
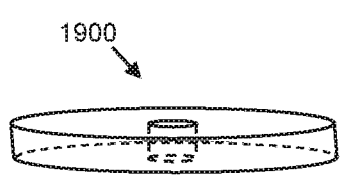
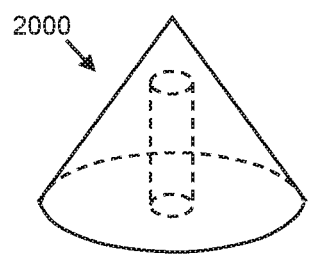
FIG. 18  FIG. 19  FIG. 20
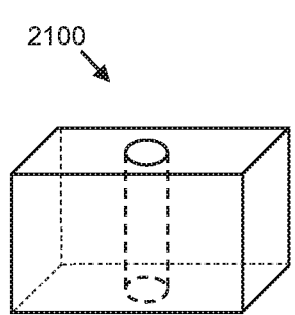
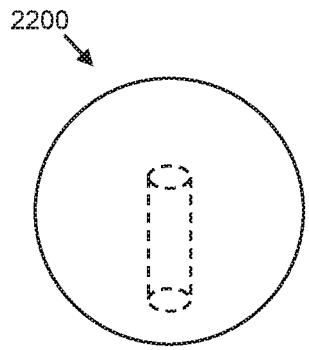
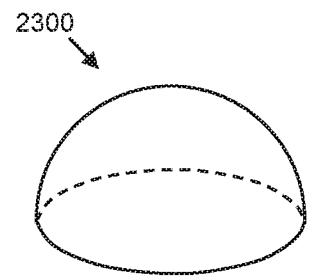
FIG. 21  FIG. 22  FIG. 23

US 10,531,526 B2

SOLID STATE MICROWAVE HEATING APPARATUS WITH DIELECTRIC RESONATOR ANTENNA ARRAY, AND METHODS OF OPERATION AND MANUFACTURE

TECHNICAL FIELD

Embodiments of the subject matter described herein relate generally to solid state microwave heating apparatus and methods of their operation and manufacture.

BACKGROUND

For many years, magnetrons have been commonly used in microwave ovens to generate microwave energy for the purpose of heating food, beverages, or other items. A magnetron essentially consists of a circular chamber with multiple cylindrical cavities spaced around its rim, a cathode built into the center of the chamber, and a magnet configured to generate a magnetic field. When incorporated into a microwave system, the cathode is coupled to a direct current (DC) power supply that is configured to provide a high voltage potential to the cathode. The magnetic field and the cylindrical cavities cause electrons within the chamber to induce a resonant, high-frequency radio frequency (RF) field in the chamber, and a portion of the field may be extracted from the chamber via a probe. A waveguide coupled to the probe directs the RF energy to a load. For example, in a microwave oven, the load may be a heating chamber, the impedance of which may be affected by objects within the heating chamber.

Although magnetrons have functioned well in microwave and other applications, they are not without their disadvantages. For example, magnetrons typically require very high voltages to operate. In addition, magnetrons may be susceptible to output power degradation over extended periods of operation. Thus, the performance of systems in which magnetrons are included may degrade over time. Further, magnetrons tend to be bulky, heavy components that are sensitive to vibration, thus making them unsuitable for use in portable applications.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 18-23 are perspective views of dielectric resonators having various shapes;

DETAILED DESCRIPTION

Figure 1:
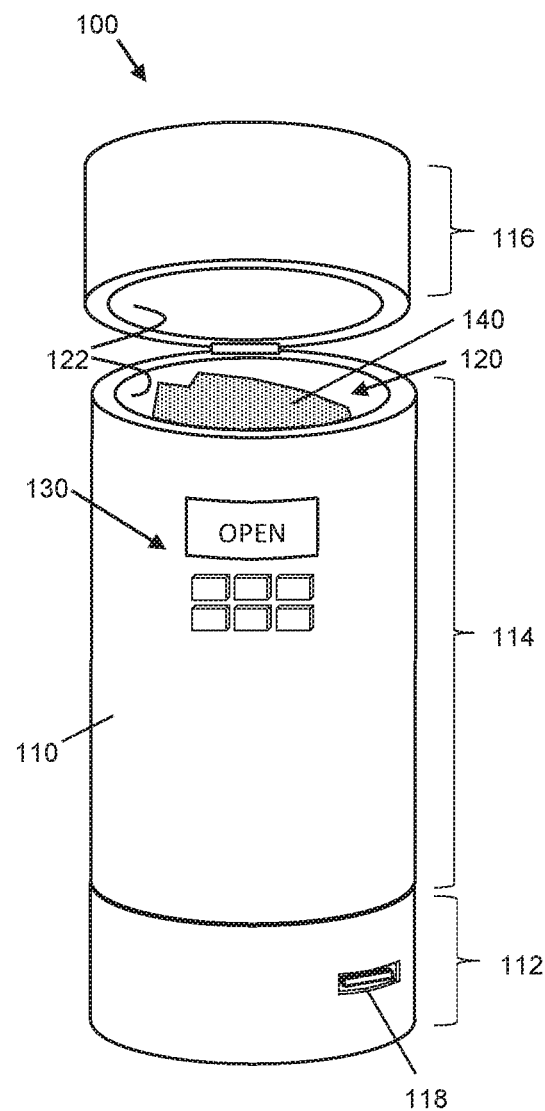
FIGS. 1 and 2 are perspective views of a portable microwave heating apparatus in open and closed states, respectively, in accordance with an example embodiment.

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

Embodiments of the subject matter described herein relate to solid-state microwave heating apparatus (e.g., stationary or portable microwave ovens, microwave defrosters, and so on), although the various embodiments may be utilized in other systems, as well. As described in greater detail below, exemplary microwave heating apparatus are realized using a microwave generation module, a dielectric resonator antenna (DRA) array, and a chamber. The microwave generation module provides RF energy to the DRA array, and the DRA array radiates energy into the chamber within which a load (e.g., a food load or some other type of load) may be positioned.

As used herein, the term "dielectric resonator" means an article consisting of a bulk dielectric material (e.g., ceramic), which is capable of receiving RF energy, and resonating the RF energy at a resonant frequency of the dielectric resonator in one or more resonant modes. The resonant frequency is determined by the shape and dimensions of the dielectric material, and the dielectric constant of the bulk dielectric material. In general, a dielectric resonator is characterized as having a relatively high dielectric constant and a relatively high Q factor. According to various embodiments, several types of resonant modes can be excited in a dielectric resonator.

As used herein, the term "dielectric resonator antenna" or "DRA" means an antenna assembly that includes a dielectric resonator and one or more RF signal feeds. The RF signal feed is configured to carry an RF signal, and is positioned with respect to the dielectric resonator so that the RF signal excites the dielectric resonator, and causes the dielectric resonator to resonate RF energy at the resonant frequency of the dielectric resonator in a resonant mode. The resonant characteristics of a DRA depend on the shape and size of the dielectric resonator and on the shape, size, and position of the feed(s). As used herein, a dielectric resonator that is directly excited by an RF signal from a feed is referred to as an "exciter dielectric resonator." Desirably, the RF signal is an oscillating signal having a frequency that is at or near the resonant frequency of the exciter dielectric resonator.

According to several embodiments, a DRA includes a dielectric resonator with one or more metallic monopole probes (i.e., feeds) inserted into the dielectric material. A ground plane may be present on one side of the DRA so that the DRA radiates power predominantly in a "forward" direction (e.g., into a heating chamber that is adjacent to the DRA). In alternate embodiments, a DRA includes a dielectric resonator disposed on or close to a grounded substrate, with energy being transferred to the dielectric resonator by way of monopole aperture feeds provided in the grounded substrate. Direct connection to and excitation by a microstrip transmission line is also possible.

The terms "dielectric resonator antenna array" and "DRA array," as used herein, mean an assembly that includes at least one DRA and at least one additional dielectric resonator that is closely capacitively coupled to the DRA. The dielectric resonator of the DRA and the additional dielectric resonator(s) are arranged in a co-planar configuration, in an embodiment. Said another way, a DRA array includes multiple closely capacitively coupled dielectric resonators and one or more feeds in or in proximity to one or more of the multiple dielectric resonators to form one or more DRAs in the array.

According to an embodiment, the dielectric resonator of the DRA is referred to as an "exciter resonator," in that it is configured to be directly excited and caused to resonate by a signal carried on a feed (i.e., it receives electromagnetic energy directly from a feed). In contrast, one or more of the dielectric resonators in the DRA array may be a "parasitic resonator," in that it does not receive electromagnetic energy directly from a feed. In such an embodiment, the one or more exciter resonator(s) of the DRA(s) and the one or more parasitic resonators are arranged so that capacitive coupling occurs between the dielectric resonators of the DRA, or more specifically between the exciter resonator(s) and the parasitic resonator(s) of the DRA. In other words, the parasitic resonator(s) are arranged so that the electric fields produced by the exciter resonator(s) (referred to as "exciter-produced electric fields") directly impinge on the one or more parasitic resonators, causing the parasitic resonator(s) also to resonate. Said another way, as a result of the exciter-produced electric field(s) impinging on a parasitic resonator, the parasitic resonator, in turn, produces a "parasitic-produced electric field." The dielectric resonators in the DRA array are arranged so that the exciter-produced and parasitic-produced electric fields each are primarily directed in substantially the same direction. In an embodiment of a microwave heating apparatus, the exciter-produced and parasitic-produced electric fields each are primarily directed in the direction of a heating chamber of a microwave heating apparatus, where the chamber is configured to contain a load (e.g., a food load) to be heated. As used herein, the term "heat" and its various derivatives refer to increasing the thermal energy of a mass. Although such an increase in the thermal energy (or "heating") may raise the temperature of the mass to a temperature that is significantly above an ambient temperature, "heating" also may involve raising the temperature of the mass by any amount (e.g., defrosting the mass to raise the temperature from below freezing to an ambient temperature).

As will be discussed in more detail below, the embodiments of DRA arrays disclosed herein constitute relatively wideband structures, which efficiently couple RF energy from the microwave generation module into a load within the heating chamber. Because of the wide bandwidth, the embodiments of the DRA arrays are much less sensitive to near field loading (e.g., due to loads placed within the chamber), when compared with conventional antennas used in microwave heating applications.

Figure 2:
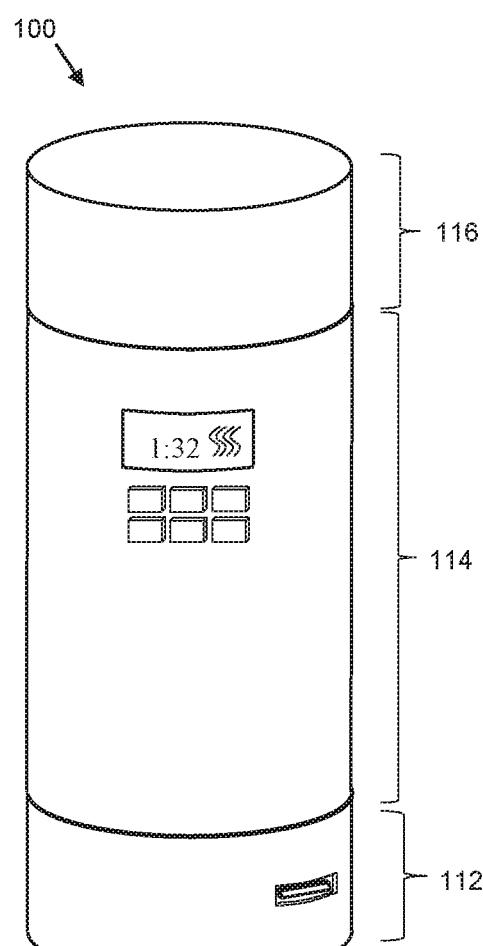

FIGS. 1 and 2 are perspective views of a portable microwave heating apparatus 100 in open and closed states, respectively, in accordance with an example embodiment. Microwave heating apparatus 100 includes a housing 110, a heating chamber 120, a control panel 130, one or more microwave power generation modules (e.g., module 350, FIG. 3), one or more DRA arrays (e.g., DRA array 500, FIG. 5), and other components that are discussed in more detail below.

The housing 110 includes a base portion 112, a chamber portion 114, and a lid 116, in an embodiment. The base portion 112 may contain the microwave power generation module(s) and at least one DRA array, in an embodiment. In addition, the base portion 112 may contain a power supply system, such as a rechargeable or non-rechargeable battery system for powering the microwave power generation module(s) and the control panel 130. An external connection port 118, when coupled to a corresponding cable (not shown), may be used to receive power to operate the apparatus 100, and/or to recharge a rechargeable battery system of the apparatus 100. In addition, the external connection port 118 may be used to communicate with an external system to receive software updates, for example.

Figure 9:
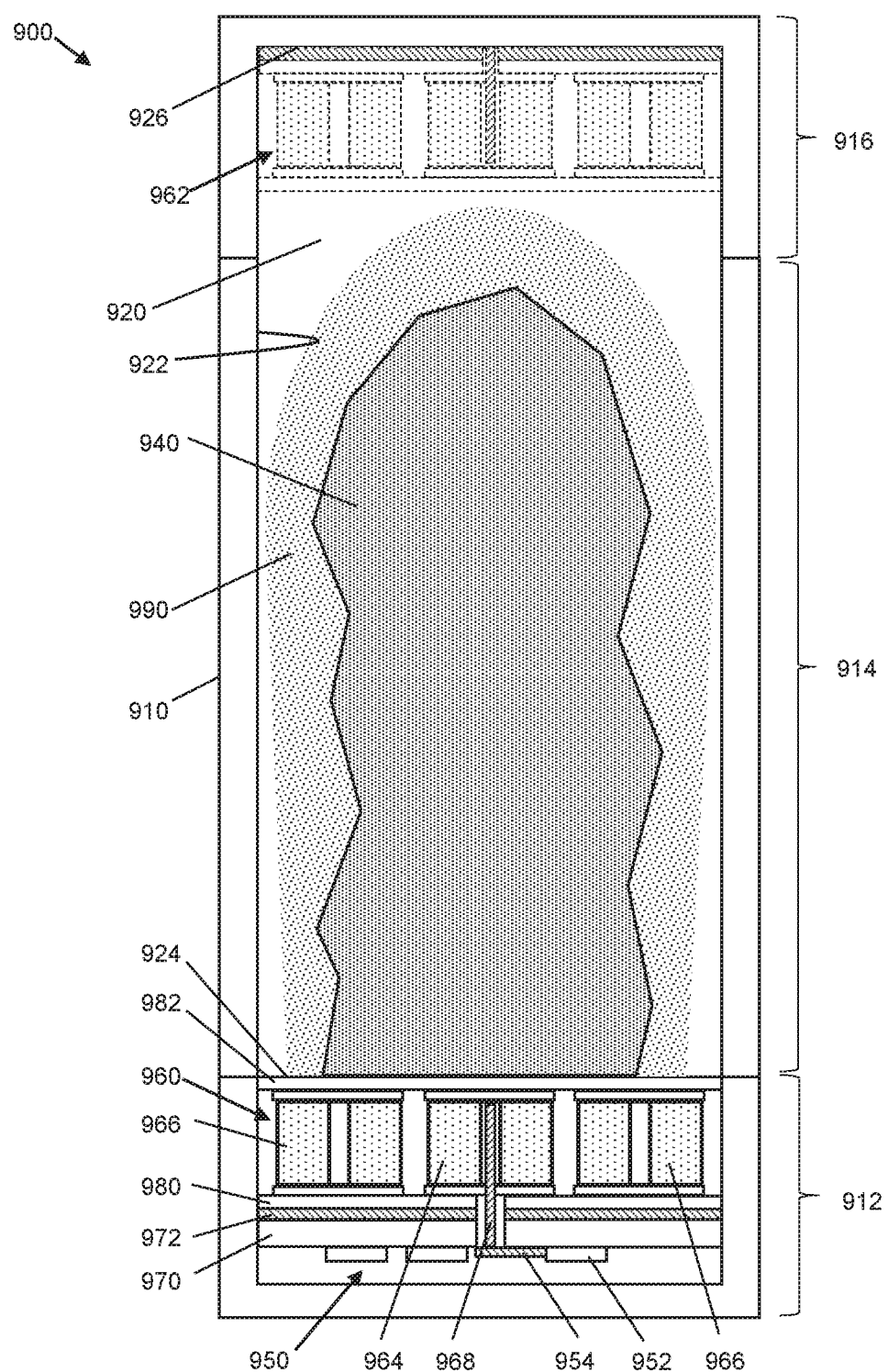
FIG. 9 is a cross-sectional, side view of the portable microwave heating apparatus of FIGS. 1 and 2, in accordance with an example embodiment.

The heating chamber 120 is located within the chamber portion 114 of the housing 110, and is defined by interior side walls 122, a chamber bottom surface (e.g., surface 924, FIG. 9), and a chamber top surface (e.g., surface 926, FIG. 9). When lid 116 is open, as shown in FIG. 1, the heating chamber 120 is accessible, and a load 140 (e.g., a food load or other load) may be placed within the chamber 120. When lid 116 is closed, as shown in FIG. 2, the heating chamber 120 becomes an enclosed air cavity, which essentially functions as a waveguide with a blocked end. According to an embodiment, the microwave generation module(s) are deactivated when the lid 116 is open, and may only be activated when the lid 116 is closed. Accordingly, the microwave heating apparatus 100 may include a sensor or other mechanism for detecting the state (i.e., open or closed) of the lid 116.

To operate the microwave heating apparatus 100, a user may open the lid 116, place one or more objects (e.g., load 140) into the heating chamber 120, close the lid 116, and provide inputs via the control panel 130 that specify a desired heating duration and a desired power level. In response, a system controller (e.g., controller 310, FIG. 3) causes the microwave power generation module(s) (e.g., module 350, FIG. 3) to provide an excitation signal to the DRA array(s) (e.g., DRA array 360, FIG. 3). The DRA array, in response, radiates electromagnetic energy in the microwave spectrum (referred to herein as "microwave energy") into the heating chamber 120. More specifically, the system controller causes the microwave power generation module(s) to cause the DRA array(s) to radiate microwave energy into the heating chamber 120 for a period of time and at a power level that is consistent with the user inputs. The microwave energy increases the thermal energy of the load 140 (i.e., the microwave energy causes the load to heat up).

Each DRA array is configured to radiate microwave energy into the heating chamber 120. The radiated energy has a wavelength in the microwave spectrum that is particularly suitable for heating liquid and solid objects (e.g., liquids and food), in an embodiment. For example, each DRA array may be configured to radiate microwave energy having a frequency in a range of about 2.0 gigahertz (GHz) to about 3.0 GHz into the heating chamber 120. More specifically, each DRA array may be configured to radiate microwave energy having a wavelength of about 2.45 GHz into the heating chamber 120, in an embodiment.

As will be described in further detail below, each microwave power generation module may be implemented as an integrated "solid state" module, in that each microwave power generation module includes a solid state circuit configuration to generate and radiate microwave energy rather than including a magnetron. Accordingly, embodiments of systems in which embodiments of microwave power generation modules are included may operate at relatively lower voltages, may be less susceptible to output power degradation over time, and/or may be relatively compact, when compared with conventional magnetron-based microwave systems.

Although microwave heating apparatus 100 is shown with its components in a particular relative orientation with respect to one another, it should be understood that the various components may be oriented differently, as well. In addition, the physical configurations of the various components may be different. For example, control panel 130 may have more, fewer, or different user interface elements, and/or the user interface elements may be differently arranged. Alternatively, control panel 130 may be located within the base portion 112 or the lid portion 116 of the apparatus 100. In addition, although a substantially cylindrical apparatus 100 and heating chamber 120 is illustrated in FIG. 1, it should be understood that a heating chamber may have a different shape, in other embodiments (e.g., rectangular, ellipse, and so on). Further, microwave heating apparatus 100 may include additional components that are not specifically depicted in FIG. 1. Further still, although embodiments of "portable" microwave heating apparatus are illustrated and described herein in detail, those of skill in the art would understand that the inventive embodiments of DRA arrays also could be applied to stationary microwave heating apparatus (e.g., larger apparatus and/or apparatus that are powered by an external electricity supply network (or grid)).

Figure 3:
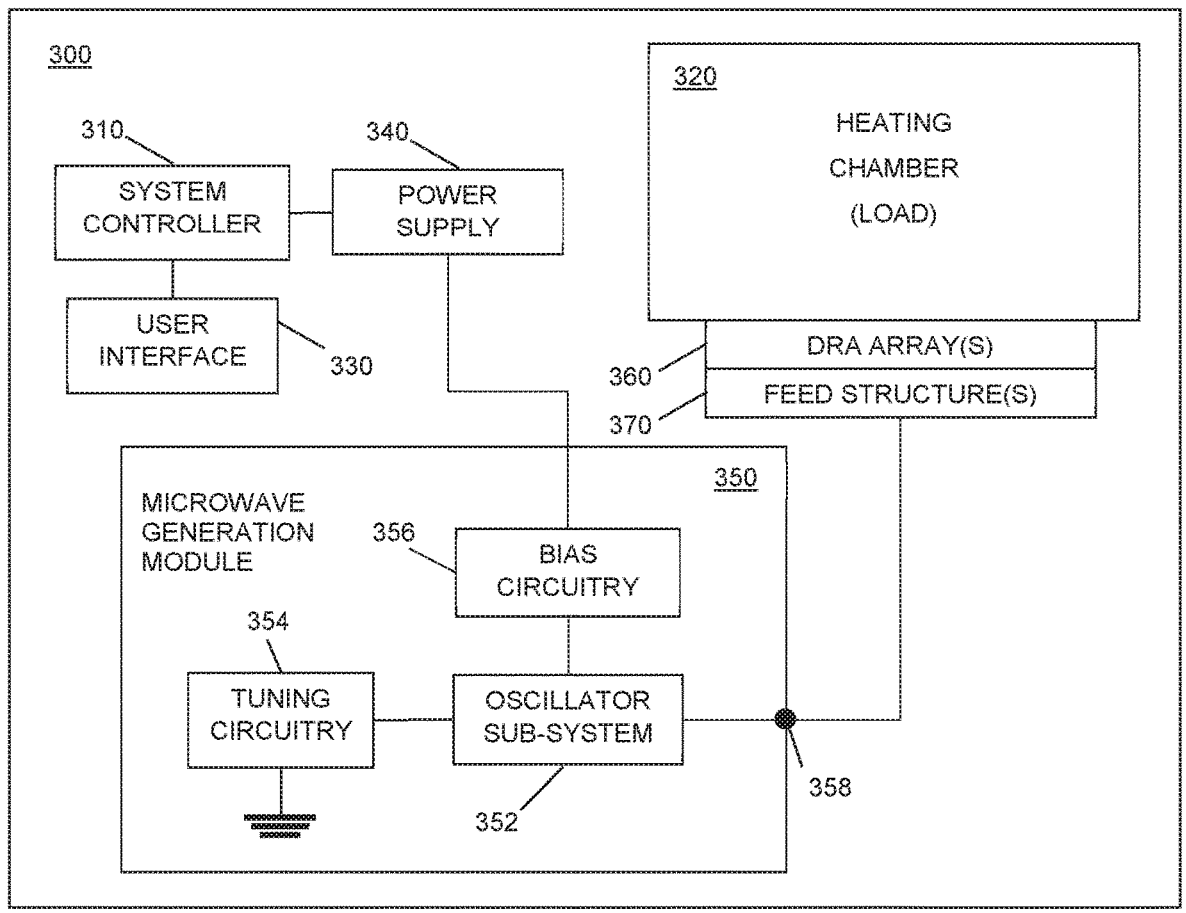
FIG. 3 is a simplified block diagram of a microwave heating apparatus that includes a microwave power generation module and a dielectric resonator antenna (DRA) array, in accordance with an example embodiment.

FIG. 3 is a simplified block diagram of a microwave heating apparatus 300 (e.g., microwave heating apparatus 100, FIG. 1) that includes one or more DRA arrays 360, in accordance with an example embodiment. In addition, microwave system 300 includes a system controller 310, user interface 330, power supply 340, heating chamber 320, and one or more microwave power generation modules 350. It should be understood that FIG. 3 is a simplified representation of a microwave system 300 for purposes of explanation and ease of description, and that practical embodiments may include other devices and components to provide additional functions and features, and/or the microwave system 300 may be part of a larger electrical system.

User interface 330 may correspond to a control panel (e.g., control panel 130, FIG. 1), for example, which enables a user to provide inputs to the system regarding parameters for a heating operation (e.g., the duration of a heating operation, the power level for a heating operation, codes that correlate with particular heating operation parameters, and so on), start and cancel buttons, and so on. In addition, the user interface may be configured to provide user-perceptible outputs indicating the status of a heating operation (e.g., a countdown timer, audible tones indicating completion of the heating operation, and so on) and other information.

System controller 310 is coupled to user interface 330 and to power supply system 340. For example, system controller 310 may include one or more general purpose or special purpose processors (e.g., a microprocessor, microcontroller, Application Specific Integrated Circuit (ASIC), and so on), volatile and/or non-volatile memory (e.g., Random Access Memory (RAM), Read Only Memory (ROM), flash, various registers, and so on), one or more communication busses, and other components. According to an embodiment, system controller 310 is configured to receive signals indicating user inputs received via user interface 330, and to cause power supply 340 to provide power to the microwave power generation module(s) 350 for time durations and at power levels that correspond to the received user inputs.

Power supply 340 may selectively provide a supply voltage to each microwave power generation module 350 in accordance with control signals received from system controller 310. When supplied with an appropriate supply voltage from power supply 340, each microwave power generation module 350 will produce an RF signal, which is conveyed to one or more feed structures 370 (or "feeds") that form portions of the DRA array(s) 360. The DRA array(s) 360, in response, radiate microwave energy into heating chamber 320. As mentioned previously, heating chamber 320 essentially functions as a waveguide with a closed end. The dielectric resonators of the DRA array(s) 360, the heating chamber 320, and any loads (e.g., load 140, FIG. 1) positioned in the heating chamber 320 correspond to a cumulative load for the microwave energy produced by the DRA array(s) 360. More specifically, the dielectric resonators, the heating chamber 320, and the load within the heating chamber 340 present an impedance to the microwave power generation module(s) 350.

According to an embodiment, each microwave power generation module 350 may include a solid-state oscillator sub-system 352, frequency tuning circuitry 354, and bias circuitry 356. According to an embodiment, the oscillator sub-system 352 includes a solid-state amplifier (e.g., including one or more power transistors) and resonant circuitry. In various embodiments, the power amplifier within the oscillator sub-system 352 may include a single ended amplifier, a double ended amplifier, a push-pull amplifier, a Doherty amplifier, a Switch Mode Power Amplifier (SMPA), or another type of amplifier.

In an embodiment, oscillator sub-system 352 is a power microwave oscillator, in that the elements of the oscillator sub-system 352 are configured to produce an oscillating electrical signal, at output node 358, where the signal has a frequency in the microwave spectrum with a relatively high output power (e.g., an output power in a range of about 100 Watts (W) to about 300 W or more). The resonant circuitry, which is coupled along a feedback path between the output and input of the power amplifier, completes a resonant feedback loop that causes the amplified electrical signals produced by the power amplifier to oscillate at or near the resonant frequency of the resonant circuitry. In an embodiment, the resonant circuitry is configured to resonate at frequency in the microwave spectrum (e.g., at a frequency of about 2.45 GHz). The amplified electrical signals produced by the amplifier arrangement oscillate at about the frequency of resonance of the resonant circuit. It should be noted that, in practice, embodiments of the resonant circuitry may be configured to resonate at different frequencies to suit the needs of the particular application utilizing the microwave system 300.

According to an embodiment, the power amplifier is implemented as a single- or multi-stage transistor having an input terminal (or control terminal) coupled to the tuning circuitry 354 and an output terminal (e.g., a drain terminal) coupled to the amplifier output node 358. For example, the transistor may include a field effect transistor (FET) having a gate terminal connected to the tuning circuitry 354, a drain terminal connected to the amplifier output node 358, and a source terminal connected to a ground reference voltage (e.g., about 0 Volts, although the ground reference voltage may be higher or lower than 0 Volts, in some embodiments). For example, the transistor may include a laterally diffused metal oxide semiconductor FET (LDMOSFET) transistor. However, it should be noted that the transistor is not intended to be limited to any particular semiconductor technology, and in other embodiments, the transistor may be realized as a gallium nitride (GaN) transistor, another type of MOSFET transistor, a bipolar junction transistor (BJT), or a transistor utilizing another semiconductor technology.

Frequency tuning circuitry 354 includes capacitive elements, inductive elements, and/or resistive elements that are configured to adjust the oscillating frequency of the oscillating electrical signals generated by the oscillator sub-system 352. In an exemplary embodiment, the frequency tuning circuitry 354 is coupled between a ground reference voltage and the input of the oscillator sub-system 352.

Bias circuitry 356 is coupled between the power supply 340 and the oscillator sub-system 352, and is configured to receive a positive (or supply) voltage from power supply 340. According to an embodiment, bias circuitry 356 is configured to control the direct current (DC) or nominal bias voltages at the gate and/or drain terminals of the transistor(s) within the oscillator sub-system 352, in order to turn the transistor(s) on and to maintain the transistor(s) operating in the active mode during operation of the oscillator sub-system 352. Although not illustrated, bias circuitry 356 also may include a temperature sensor and temperature compensation circuitry configured to sense or otherwise detect the temperature of the transistor(s) and to adjust the gate bias voltage in response to increases and/or decreases in the temperature of the transistor(s). In such an embodiment, bias circuitry 356 may be configured to maintain substantially constant quiescent current for the transistor(s) in response to temperature variations.

Through one or more impedance matching circuits (not shown), the oscillator sub-system 352 is coupled to feed structure(s) 370. As will be explained in more detail below, embodiments of feed structures 370 include conductive structures that are positioned within one or more dielectric resonators of one or more DRA arrays 360. Alternatively, the feed structures 370 may include microstrip lines that are aperture coupled to one or more dielectric resonators of one or more DRA arrays 360.

The DRA array(s) 360 are configured to radiate microwave energy into the heating chamber 320. More specifically, the feed structure(s) 370 and DRA array(s) 360 translate the oscillating electrical signals at the oscillator output node 358 into electromagnetic microwave signals. For example, in a microwave heating apparatus application where the oscillator sub-system 352 is configured to produce signals at a frequency of about 2.45 GHz, the DRA array(s) 360 translate the oscillating electrical signals at the oscillator output node 358 into microwave electromagnetic signals at 2.45 GHz, and direct the microwave signals into the heating chamber 320 of the microwave heating apparatus 300.

When the microwave heating apparatus 300 includes multiple DRA arrays 360, the DRA arrays 360 may be configured to resonate at the same frequency and power level, and may be operated simultaneously or in a defined sequence. Alternatively, the DRA arrays 360 may be configured differently (e.g., they may resonate at different frequencies, and or may radiate microwave energy at different power levels). In such alternate embodiments, the DRA arrays 360 may be operated simultaneously or in a defined sequence.

As will be depicted in more detail in FIGS. 5-7 and 9-17, each DRA array includes a plurality of dielectric resonators that are arranged so that at least one parasitic resonator is closely capacitively coupled with at least one exciter resonator. Before discussing various embodiments of DRA arrays in detail, an embodiment of a fundamental building block of a DRA array, or more specifically an embodiment of a dielectric resonator, will be discussed in conjunction with FIG. 4.

Figure 4:
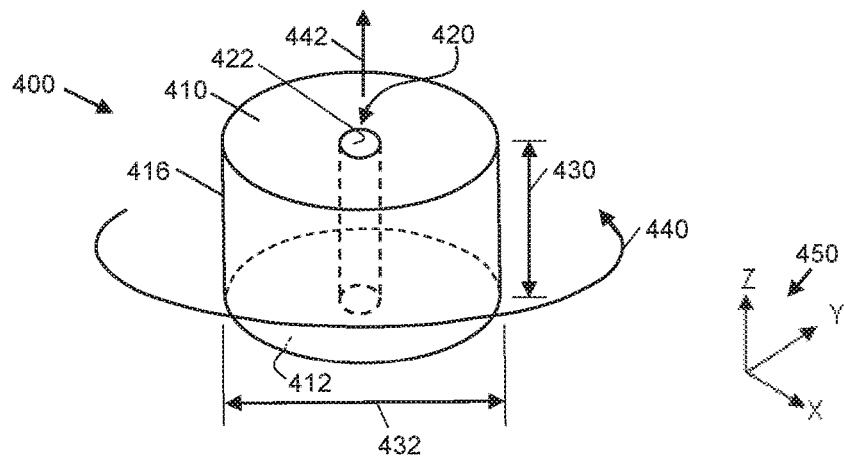
FIG. 4 is a perspective view of a dielectric resonator.

FIG. 4 is a perspective view of a dielectric resonator 400, which is suitable for use in an embodiment of a DRA array. Dielectric resonator 400 is formed from a bulk dielectric material, such as ceramic, a perovskite compound (e.g., incorporating $Nd_2O_3$, $TiO_2$, CaO/SrO, BaO, MgO, ZnO, CoO, $Ta_2O_5$, and/or $Nb_2O_5$, and so on), or other suitable materials. According to an embodiment, the bulk dielectric material has a relatively high dielectric constant, such as a dielectric constant between about 8 and about 70, although the dielectric constant could be larger or smaller, as well. Further, the bulk dielectric material has a relatively high quality factor (Q), in an embodiment, such as an unloaded Q between about 40,000 and about 300,000, although the bulk dielectric material may have a lower or higher unloaded Q, as well. Further still, the bulk dielectric material has an extremely low coefficient of thermal expansion (e.g., about zero ppm), in an embodiment.

In the illustrated embodiment, the dielectric resonator 400 has a cylindrical shape with a top surface 410, a bottom surface 412, and external sidewalls 416 extending between the top and bottom surfaces 410, 412. In addition, the dielectric resonator 400 has a central channel or hole 420 extending between the top and bottom surfaces 410, 412, where the central hole 420 is defined by internal sidewalls 422. As will be discussed in more detail later in conjunction with FIGS. 18-23, dielectric resonators having a variety of other shapes may be used in various other embodiments of a DRA array.

The illustrated dielectric resonator 400 may be utilized as an exciter resonator or as a parasitic resonator in a DRA array. When utilized as an exciter resonator, a conductive feed (e.g., feed 550, FIG. 5) may be inserted into the central hole 420 from the bottom surface 412 of the dielectric resonator 400, and an RF signal provided to the feed may be used to cause the dielectric resonator 400 to resonate at a characteristic resonant frequency of the dielectric resonator 400. For example, the resonant frequency may be in a range of about 2.0 GHz to about 3.0 GHz, although the resonant frequency may be lower or higher, as well. The resonant frequency of the dielectric resonator 400 is defined, at least in part, by the dielectric constant of the bulk dielectric material, and by the shape and size (e.g., height 430 and diameter 432) of the dielectric resonator 400. In general, the higher the dielectric constant, the smaller a dielectric resonator may be for a given resonant frequency. In addition, for any given dielectric constant and dielectric resonator shape, a smaller dielectric resonator resonates at a higher resonant frequency that a larger dielectric resonator.

In the embodiment illustrated in FIG. 4, the dielectric resonator 400 has a circular cross-sectional area. As such, when an RF signal is used to excite the dielectric resonator 400, a circumferential e-field 440 (referred to herein as a "primary" electric field) is produced by the dielectric resonator 400. In addition, when a feed positioned in the dielectric resonator 400 carries a suitable RF signal, a vertical or secondary e-field 442 (i.e., an e-field 442 that is orthogonal to the top and/or bottom surfaces 410, 412) also is generated. The strength of the secondary or orthogonal e-field 442 may depend, at least in part, on how far the feed extends into the central hole 420. Either way, when appropriately excited by an RF signal carried by the feed, the dielectric resonator 400 may produce electromagnetic energy fields directed in three polarizations with respect to orthogonal axes of an inertial coordinate system (e.g., orthogonal axes "X," "Y," and "Z" of a fixed, inertial coordinate system 450).

As mentioned above, a DRA array that may be suitable for use in a microwave heating apparatus (e.g., microwave heating apparatus 100, 200, FIGS. 1, 2) may include a plurality of dielectric resonators (e.g., multiple instances of dielectric resonator 400, FIG. 4) that are arranged so that at least one parasitic resonator is closely capacitively coupled with at least one exciter resonator. Alternatively, each of the dielectric resonators in the DRA array may be directly excited by a feed, making all of the dielectric resonators classifiable as exciter resonators.

Figure 5:
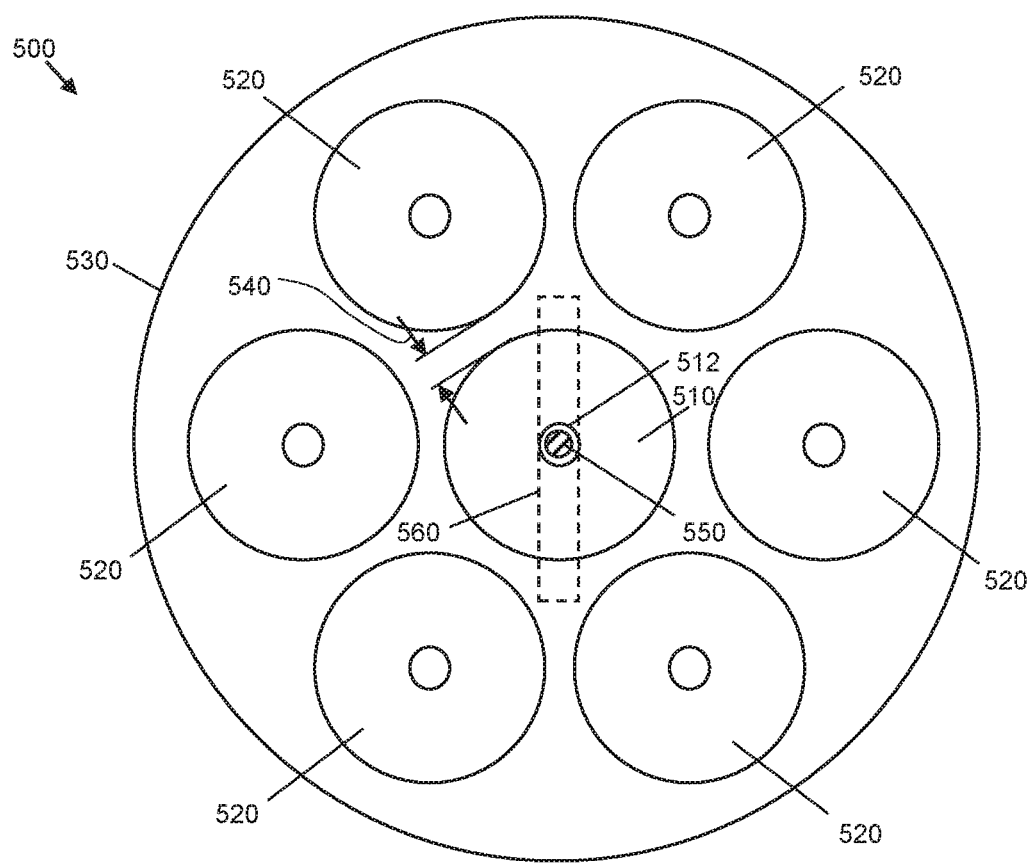
FIGS. 5 and 6 are top and perspective views of the DRA array, in accordance with an example embodiment.
Figure 6:
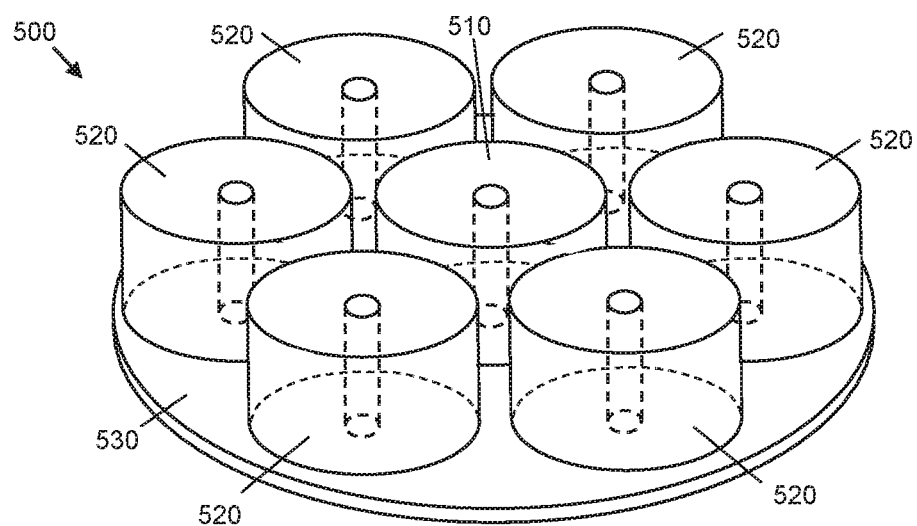

For example, FIGS. 5 and 6 are top and perspective views of a DRA array 500, in accordance with an example embodiment. The illustrated array 500 includes seven dielectric resonators 510, 520 coupled to a substrate 530. In an embodiment, the dielectric resonators 510, 520 are physically coupled to a first side of the substrate 530 to maintain fixed spatial relationships between the dielectric resonators 510, 520. For example, the substrate 530 may be a rigid or flexible, non-electrically-conductive material with good thermal conductivity. For example, but not by way of limitation, the substrate 530 may be formed from fiberglass (e.g., woven fiberglass), polytetrafluoroethylene (PTFE), nylon, or other suitable materials. As will be discussed in more detail later in conjunction with FIG. 9, the substrate 530 material may be chosen to provide sufficient electrical isolation from an underlying ground plane, with which the substrate 530 may be slidably engaged.

A feed 550 configured to carry an RF signal is positioned within the central hole 512 of the center dielectric resonator 510. So configured, the center dielectric resonator 510 and the feed 550 form a dielectric resonator antenna (DRA).

When an appropriate RF signal is carried by the feed 550, the signal will cause the center dielectric resonator 510 to resonate at its resonant frequency. This, in turn, will cause the center dielectric resonator 510 to produce a primary e-field around the circumference of the center dielectric resonator 510 (e.g., e-field 440, FIG. 4). In addition, the center dielectric resonator 510 may produce a secondary e-field extending orthogonally upward from the top surface of the center dielectric resonator 510 (e.g., e-field 442, FIG. 4).

Figure 12:
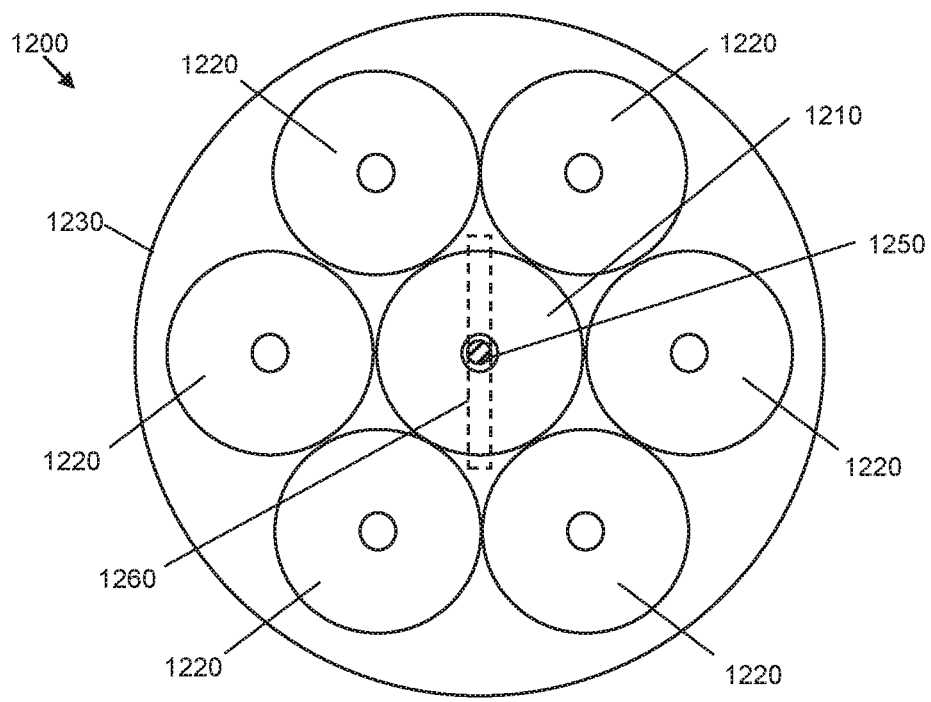
FIG. 12 is a top view of a DRA array suitable for use in a microwave heating apparatus, in accordance with another example embodiment.

According to an embodiment, the center dielectric resonator 510 and the adjacent dielectric resonators 520 are oriented in a co-planar manner, in that the top and/or bottom surfaces of the dielectric resonators 510, 520 (or cross-sections taken through the dielectric resonators 510, 520) are co-planar. In addition, the center dielectric resonator 510 and the adjacent dielectric resonators 520 are "closely capacitively coupled" with each other by positioning the center and adjacent dielectric resonators 510, 520 within a reasonably small distance 540 of each other. More specifically, the smallest distance 540 between the sidewalls of the dielectric resonators 510, 520 is selected so that the dielectric resonators 510, 520 are closely capacitively coupled when a suitable excitation signal is provided to the feed 550. According to an embodiment, the distance 540 between the sidewalls of the center dielectric resonator 510 and the adjacent dielectric resonators 520 is less than one tenth of the wavelength of the resonant frequency of the center dielectric resonator 510 (or one tenth of lambda). For example, for a resonant frequency of about 2.5 GHz, the distance 540 may be about 12.5 millimeters (mm) or less. According to another embodiment, the distance 540 is less than one fiftieth of lambda. For example, for a resonant frequency of about 2.5 GHz, the distance 540 may be about 3.0 mm or less. In some embodiments, the center and adjacent dielectric resonators 510, 520 may be between about 1.0 mm and 2.0 mm apart. In still another embodiment, the distance 540 may be zero (i.e., the center dielectric resonator 510 and the adjacent dielectric resonators 520 may be touching, as is shown in FIG. 12).

When the center and adjacent dielectric resonators 510, 520 are in close proximity to each other, as described above, the circumferential or primary e-field produced by the center dielectric resonator 510 (e.g., e-field 440, FIG. 4) may directly impinge upon the adjacent dielectric resonators 520. This, in turn, may cause the adjacent dielectric resonators 520 to resonate at their respective resonant frequencies. Accordingly, the center dielectric resonator 510 may be classified as an "exciter resonator." In contrast, in the embodiment illustrated in FIG. 5, none of the adjacent dielectric resonators 520 are directly excited by a feed. Therefore, they may be classified as "parasitic resonators."

Given an appropriate excitation signal, the center and adjacent dielectric resonators 510, 520 capacitively couple to each other, and each dielectric resonator 510, 520 resonates at its resonant frequency. Accordingly, the DRA array 500 of FIGS. 5 and 6 essentially includes a plurality of capacitively coupled resonators 510, 520. Each dielectric resonator 510, 520 essentially is an antenna that may radiate efficiently in space, thus forming a "distributed antenna." As will be made clearer by the description of FIG. 7, a distributed antenna embodied by a DRA antenna such as DRA antenna 500 may couple efficiently to a near-field load (e.g., a food load within a heating chamber), even when the load is relatively small and/or is positioned in various locations with respect to the DRA antenna 500.

Although the center dielectric resonator 510 may be excited by a feed 550 positioned within the central hole 512 of the dielectric resonator 510, the center dielectric resonator 510 alternatively may be aperture coupled to a microstrip line 560 or other conductive structure, which instead may be used to carry an RF signal for exciting the dielectric resonator 510. In addition or alternatively, an exciter dielectric resonator may be excited by a feed that is placed in a location other than a center hole, and/or multiple feeds may be used to excite a dielectric resonator.

In the embodiment illustrated in FIGS. 5 and 6, the DRA array 500 includes seven dielectric resonators 510, 520. In alternate embodiments, a DRA array may include any number of dielectric resonators in a range of two to thirty or more. In addition, all of the dielectric resonators 510, 520 are sufficiently the same size and shape. Assuming they all are formed from one or more materials with the same dielectric constant, each of the dielectric resonators 510, 520 will resonate at substantially the same resonant frequency. In alternate embodiments, dielectric resonators may be selected that resonate at different resonant frequencies. This may be accomplished by using dielectric resonators of different sizes, dielectric resonators of different shapes, and/or dielectric resonators with different dielectric constants, for example.

Figure 7:
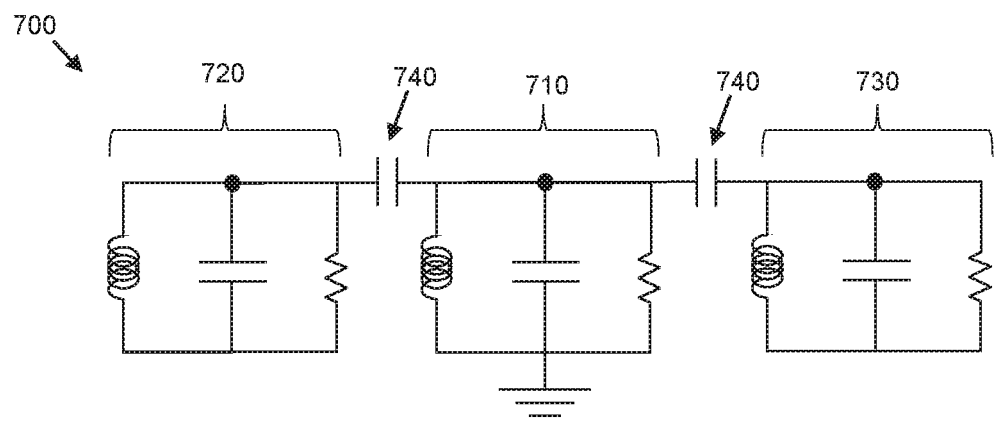
FIG. 7 is a circuit diagram representing the electrical characteristics of a DRA with three adjacent dielectric resonators, in accordance with an embodiment.

FIG. 7 is a circuit diagram 700 representing the electrical characteristics of a DRA with three adjacent dielectric resonators, in accordance with an embodiment. More specifically, a first resonant circuit 710 represents an exciter dielectric resonator (e.g., center dielectric resonator 510, FIG. 5), and second and third adjacent resonant circuits 720, 730 represent parasitic dielectric resonators (e.g., two of dielectric resonators 520, FIG. 5) positioned adjacent to the first (exciter) resonator 710. According to an embodiment, a feed is placed in proximity to the exciter dielectric resonator (or the first resonant circuit 710), and through capacitive coupling, the exciter dielectric resonator (or the first resonant circuit 710) couples to the parasitic dielectric resonators (or the second and third resonant circuits 720, 730).

As discussed above, the parasitic dielectric resonators are placed in close enough proximity to the exciter dielectric resonator to ensure that the resonators are closely capacitively coupled, as represented by capacitors 740. Essentially, the capacitive coupling (i.e., the value of capacitors 740) between the resonant circuits 710, 720, 730 is inversely related to the distance between the dielectric resonators represented by the resonant circuits 710, 720, 730. Different spacings between the dielectric resonators results in different intensities of the capacitive coupling and different frequency responses. More specifically, changes in the frequency response may significantly affect the bandwidth of the circuit 700. In some embodiments, the dielectric resonators may be sized, shaped, and positioned with respect to each other to create a relatively broadband circuit 700. In other words, the individual dielectric resonators may be positioned (or capacitively coupled together) to give a composite broadband response.

In the electrical representation of FIG. 7, each resonant circuit 710, 720, 730 includes an inductor and capacitor in parallel (which together form the resonator), and a resistance (Rr), which represents the radiation resistance. More specifically, as a DRA array represented by circuit 700 is used to radiate energy into a heating chamber, the radiation resistance represents the energy loss into the chamber as a result of radiation of energy away from the DRA array. Each of the resonators in resonant circuits 710, 720, 730 may radiate at the same frequency (e.g., when the dielectric resonators are identical), or the resonators in resonant circuits 710, 720, 730 may resonate at different frequencies (e.g., when the dielectric resonators are different in size, shape, and/or dielectric constant).

Figure 8:
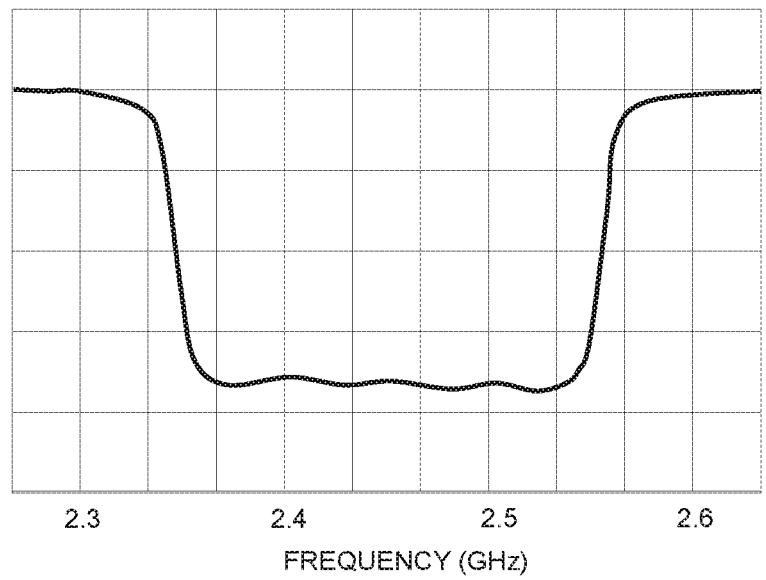
FIG. 8 is a graph depicting the gain bandwidth of a DRA array, in accordance with an embodiment.

FIG. 8 is a graph depicting the gain bandwidth of a DRA array (e.g., DRA array 500, FIG. 5), in accordance with an embodiment. More specifically, the graph depicts the gain bandwidth of an embodiment of a DRA antenna with an unloaded center frequency of about 2.45 GHz. A DRA with a single dielectric resonator may have a fairly narrowband response (e.g., between about 2.4 GHz and 2.5 GHz). However, embodiments of DRA arrays discussed above (and later) include at least one DRA and one or more adjacent dielectric resonators, which technically increases the aperture of the antenna, resulting in a significantly wider band response (e.g., about 200 megahertz bandwidth between about 2.3 GHz and 2.6 GHz at the −10 dB points).

Due to the relatively wideband response, and as will be discussed in more detail below, embodiments of DRA arrays may be significantly less sensitive to near-field loads than conventional monopole antennas, patch antennas, or other types of narrowband antennas. This makes the DRA array embodiments particularly well suited to microwave heating applications in which the heating chamber is in close proximity to the radiating element (in this case the DRA array). As is known in antenna theory, a substantial near-field load may cause a relatively narrow-band antenna to become de-tuned to the extent that the energy produced by the antenna shifts out of the desired, unloaded band. If this were the case in a microwave heating application, the antenna would be incapable of launching energy into the heating chamber. However, the wideband response of the various embodiments of DRA array structures ensures that the DRA array structures may launch significant energy within the band of interest (e.g., within a band centered around 2.45 GHz) into the heating chamber and the load, even when the load is a near-field load (e.g., a food load placed in a heating chamber to which the DRA array structure is proximate). In other words, even if a near-field load causes the DRA array structure response to move in frequency, the embodiments of DRA array structures are wideband enough that the response does not move outside of the relatively wide band, thus enable efficient energy transfer into the near-field load. The DRA array creates a broadband frequency response, which is significantly less sensitive to near-field loads and load positions within the heating chamber. In addition, the wideband response of the DRA array embodiments ensures that energy may be efficiently provided to food loads with a wide range of dielectric constants. Because of the wide bandwidth of the various embodiments of DRA arrays, the launch efficiency into an adjacent heating chamber may be as high as 95 percent or more.

FIG. 9 is a cross-sectional, side view of the portable microwave heating apparatus 100 of FIGS. 1 and 2, in accordance with an example embodiment. Microwave heating apparatus 900 includes a housing 910, a heating chamber 920, a system controller (e.g., system controller 310, not illustrated in FIG. 9), a user interface (e.g., user interface 330, not illustrated in FIG. 9), a power supply system (e.g., power supply system 340, not illustrated in FIG. 9), a microwave power generation module 950 (e.g., module 350, FIG. 3), one or more DRA arrays 960, 962 (e.g., DRA array 360, 500, FIGS. 3, 5), and other components that are discussed in more detail below. According to an embodiment, and as will be discussed in detail below, a first DRA array 960 may be positioned within a base portion 912 of the housing 910. In a further embodiment, the apparatus 900 may include one or more additional DRA arrays, such as a second DRA array 962 located within the lid 916.

The housing 910 includes the base portion 912, a chamber portion 914, and the lid 916 (which is in a closed state in FIG. 9), in an embodiment. The heating chamber 920 is located within the chamber portion 914 of the housing 910, and extends up into the interior of the lid 916, in an embodiment. The heating chamber 920 is defined by interior side walls 922, a chamber bottom surface 924, and a chamber top surface 926. FIG. 9 shows a load 940 (e.g., a food load or other load) within the chamber 920. With lid 916 closed, as shown in FIG. 9, the heating chamber 920 is an enclosed air cavity, which essentially functions as a waveguide with a blocked end, as described previously. In the illustrated embodiment, the heating chamber 920 has a substantially circular cross-section, making the heating chamber 920 a cylindrical waveguide. In other embodiments, the chamber may have a rectangular cross-section, an elliptical cross-section, or a cross-section having another shape.

The chamber walls may be formed from a material with good thermal conductivity, in an embodiment. For example, the chamber walls may be formed from copper, aluminum, steel, or another suitable material. In some embodiments, the interior side walls 922 of the chamber 920 may be coated with a material that affects the frequency of the chamber 920. For example, the interior side walls 922 may be coated with PTFE, nylon, or another suitable material, which may reduce or otherwise affect the frequency of the chamber 920.

According to an embodiment, the base portion 912 of the housing 910 contains the first DRA array 960 and at least one electronics substrate 970. For example, the electronics substrate 970 may include a microwave or RF laminate, a PTFE substrate, a printed circuit board (PCB) material substrate (e.g., FR-4), an alumina substrate, a ceramic tile, or another type of substrate. According to an embodiment, the electronics substrate 970 includes a conductive ground plane 972 on or proximate to a first surface of the electronics substrate 970 (e.g., the upper surface in FIG. 9), and one or more other conductive layers, some of which may be patterned to provide electrical interconnects between various components mounted to the electronics substrate 970. For example, components corresponding to the system controller, portions of the user interface, the power supply, and the microwave power generation module 950, may be mounted to a second surface of the electronics substrate 970 (e.g., the lower surface in FIG. 9), in an embodiment, and those components may be electrically coupled to each other through patterned conductive layers on or below the second surface.

The first DRA array 960 may be configured similarly to DRA array 500, FIG. 5, in an embodiment, although it may be differently configured, as well. When configured like DRA array 500, FIG. 5, the first DRA array 960 may include one or more exciter resonators 964 and adjacent parasitic resonators 966, where the parasitic resonators 966 are closely capacitively coupled to the exciter resonator(s) 964, as previously described. As described in conjunction with FIG. 5, the exciter and parasitic resonators 964, 966 may be coupled to a DRA array substrate 980 (e.g., substrate 530, FIG. 5), which is slidably engaged with the first surface of the electronics substrate 970 (e.g., with the ground plane 972). According to an embodiment, a non-electrically-conductive cover 982 is positioned between the first DRA array 960 and the chamber 920. The cover 982 functions to protect the DRA array 960 from moisture and other contaminants (e.g., food splatter), and defines the bottom surface 924 of the chamber 920.

A feed 968 configured to carry an RF signal is positioned within the central hole of the exciter resonator 964, in the illustrated embodiment. According to an embodiment, the diameter of the feed 968 is smaller than the diameter of the central hole so that the feed 968, when it experiences thermal expansion, does not compress against the interior sidewalls of the central hole and potentially cause the exciter resonator 964 to crack. So configured, the exciter resonator 964 and the feed 968 form a DRA, and the DRA and the parasitic resonators 966 form the first DRA array 960.

As described previously, the microwave power generation module 950 includes tuning circuitry (e.g., tuning circuitry 354, FIG. 3), bias circuitry (e.g., bias circuitry 356, FIG. 3), and an oscillator subsystem (e.g., oscillator subsystem 352, FIG. 3). The oscillator subsystem includes one or more power transistors 952, in an embodiment. To facilitate provision of an oscillating RF signal to the feed 968, an output (e.g., a drain terminal) of a power transistor 952 (or the output of the power amplifier) is electrically coupled to the feed 968 through a conductive transmission line 954 on or below the second surface of the electronics substrate 970. The feed 968 extends through a hole in the electronics substrate 970, through a hole in the DRA array substrate 980, and into a central hole in the exciter resonator 964.

In response to user inputs provided via the user interface (e.g., via control panel 130, FIG. 1), the system controller (e.g., controller 310, FIG. 3) causes the microwave power generation module 950 to provide one or more excitation signals to the DRA array(s) 960, 962. Each DRA array 960, 962, in response, radiates electromagnetic energy (indicated by shaded area 990) into the heating chamber 920. The microwave energy increases the thermal energy of the load 940, and may cause the load to heat up.

As described above, when appropriately excited by an RF signal carried on the feed 968, the exciter resonator 964 resonates at a resonant frequency and produces a circumferential e-field (e.g., e-field 440, FIG. 4) and a vertical e-field (e.g., e-field 442, FIG. 4). According to an embodiment, the circumferential e-field directly impinges on the parasitic resonators 966, causing them to resonate at their resonant frequency (or frequencies). This causes the parasitic resonators 966 also to produce circumferential and vertical e-fields. Essentially, each resonator 964, 966 of the DRA array 960 has a radiation pattern. Given the nature of the e-fields and the presence of ground plane 972, the cumulative radiation is directed toward and into the chamber 920 in a fairly directional beam. In other words, the DRA array 960 operates as an antenna array that directs a fairly narrow, fixed beam of electromagnetic energy into the chamber 920.

As mentioned previously, the chamber 920 essentially functions as an electromagnetic waveguide with a blocked end, where electromagnetic waves within the chamber 920 generally propagate in a direction from the DRA array 960 toward the top surface 926 of the chamber 920. More particularly, electromagnetic waves may propagate through the chamber 920 in one or more propagation modes, including one or more transverse electric (TE) modes, transverse magnetic (TM) modes, and/or hybrid transverse electric and magnetic (TEM) modes. However, the electromagnetic waves will propagate in the chamber 920 only when the frequency of the electromagnetic energy produced by the DRA array(s) 960, 962 exceeds a lower threshold or minimum frequency for the chamber 920, which is commonly referred to as the cutoff frequency.

The cutoff frequency for the chamber 920 is defined by the size (e.g., defined by height and diameter) and shape (e.g., cylindrical, rectangular, elliptical, and so on) of the chamber 920. According to an embodiment, and not accounting for the loading that occurs as a result of the presence of the DRA array(s) 960, 962 or a load 940 present within the chamber 920, the size and shape of the chamber 920 renders the chamber 920 as being below cutoff. In other words, in the desired band of operation for microwave heating (e.g., between 2.3 GHz and 2.6 GHz, and referred to below as the "microwave heating band"), and absent the DRA array(s) 960, 962 and load 940, the chamber 920 is configured so that no mode can propagate in the chamber 920 for electromagnetic energy within the microwave heating band, regardless of how it is excited. For example, the chamber 920 may have a size and shape which may not support any propagation mode when excited by electromagnetic energy below 3.0 GHz, when unloaded.

However, in microwave heating apparatus 900, and due in part to the high dielectric constant(s) of the dielectric resonators 964, 966, the DRA array(s) 960, 962 function to load the chamber 920 in a manner that enables one or more modes to propagate within the chamber 920 in the microwave heating band. In other words, the loading provided by the DRA array(s) 960, 962 bring the chamber 920 to a resonant frequency that is within the microwave heating band (i.e., the chamber 920 is not below cutoff when loaded with the DRA array(s) 960, 962). Said another way, the cutoff frequency of an otherwise below-cutoff chamber 920 is lowered into the microwave heating band by including the DRA array(s) 960, 962 within the chamber 920, in an embodiment. Accordingly, one or more modes may be propagated within the chamber 920 when the chamber is excited with electromagnetic energy (from the DRA array(s) 960, 962) that is within the microwave heating band, even though the unloaded chamber 920 may be too small to support propagation of those modes.

Depending on the shape, size, and cutoff frequency of the loaded chamber 920, it will almost naturally find the best mode of propagation, in an embodiment. Desirably, the chamber 920 is designed to support hybrid and/or complex modes, which may be advantageous in that even heating of an inserted load 940 may be enhanced when electromagnetic chaos is created within the chamber 920. In other words, when multiple modes and/or higher order modes are propagated in the chamber 920, even heating across the load 940 may be more readily achieved. Because the feed 968 may enable e-fields to be produced in three orthogonal directions (e.g., X, Y, and Z), the dominant mode in the chamber 920 automatically may be excited.

Essentially, the DRA array(s) 960, 962 are configured to couple energy into the chamber 920 efficiently, even though the chamber 920 may be below cutoff, in some embodiments. Although embodiments of microwave heating apparatus 900 may include a below-cutoff, unloaded chamber 920, as described above, in other embodiments, the unloaded chamber 920 may be sized and shaped to render the chamber 920 above cutoff (or capable of supporting one or more propagation modes when excited by electromagnetic energy within the microwave heating band, even in the absence of loading by DRA array(s) 960, 962.

During operation, the load 940 (e.g., a food load) provides additional loading in the chamber 920, in addition to the loading provided by the DRA array(s) 960, 962. More specifically, when placed as shown in FIG. 9, the load 940 is in the near field for DRA array 960. Using a conventional antenna (e.g., a monopole or patch antenna), such near field loading may de-tune the antenna to the degree that the antenna could not couple energy into the chamber or the load. However, as discussed in detail previously, the broadband characteristics of the DRA array(s) 960, 962 make them much more insensitive to near-field loading. Accordingly, even in the presence of the near-field load 940, the DRA array(s) 960, 962 may efficiently couple energy into the chamber 920 and the load 940.

Figure 10:
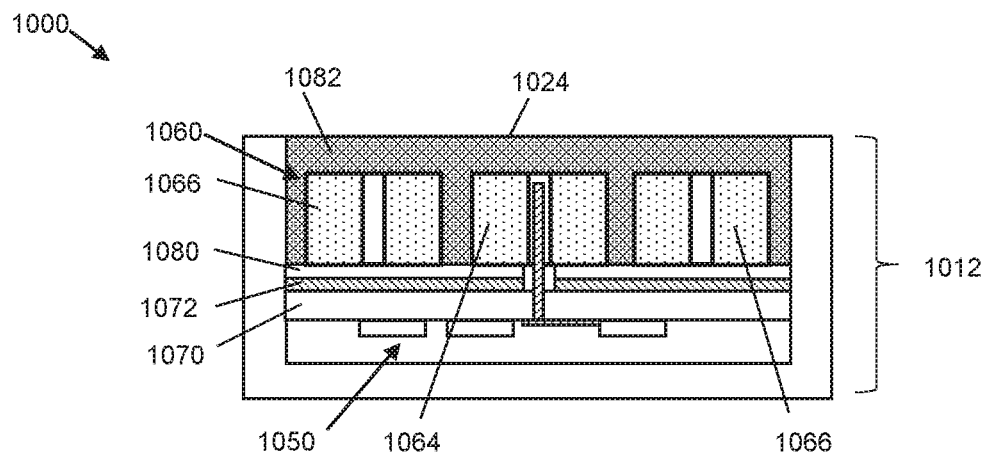
FIG. 10 is a cross-sectional, side view of a portion of a portable microwave heating apparatus, in accordance with another example embodiment.

In the embodiment of FIG. 9, the DRA array 960 is separated from the chamber 920 by a non-electrically-conductive cover 982 is positioned between the DRA array 960 and the chamber 920, where the cover 982 functions to protect the DRA array 960 from moisture and other contaminants. In an alternate embodiment, such as that illustrated in FIG. 10, a DRA array 1060 may be protected using a conformal coating 1082. For example, FIG. 10 is a cross-sectional, side view of a portion of a portable microwave heating apparatus 1000, in accordance with another example embodiment. More specifically, the portion of the microwave heating apparatus 1000 corresponds to a base portion 1012 of the apparatus 1000.

The base portion 1012 of the apparatus 1000 is similar to base portion 912 (FIG. 9), in that the assembly includes the DRA array 1060 and a substrate 1070. The DRA array 1060 may include one or more exciter resonators 1064 and adjacent parasitic resonators 1066, where the parasitic resonators 1066 are closely capacitively coupled to the exciter resonator(s) 1064, as previously described. As described in conjunction with FIG. 5, the exciter and parasitic resonators 1064, 1066 may be coupled to a DRA array substrate 1080 (e.g., substrate 530, FIG. 5), which is slidably engaged with the first surface of the electronics substrate 1070 (e.g., with the ground plane 1072).

The substrate 1070 includes a conductive ground plane 1072 on or proximate to a first surface of the substrate 1070 (e.g., the upper surface in FIG. 10), and one or more other conductive layers, some of which may be patterned to provide electrical interconnects between various components mounted to the substrate 1070. For example, components corresponding to the system controller, portions of the user interface, the power supply, and the microwave power generation module 1050, may be mounted to a second surface of the substrate 1070 (e.g., the lower surface in FIG. 10), in an embodiment, and those components may be electrically coupled to each other through patterned conductive layers on or below the second surface.

In contrast with the microwave heating apparatus 900 of FIG. 9, the DRA array 1060 is protected from moisture and other contaminants with a conformal coating 1082. For example, the conformal coating 1082 may include a non-conductive encapsulant material, such as a thermos-setting plastic, plastic ABS, an epoxy resin, PTFE, or another suitable material. According to an embodiment, the conformal coating 1082 may define the bottom surface 1024 of a chamber (not illustrated) positioned above the base portion 1012.

Figure 11:
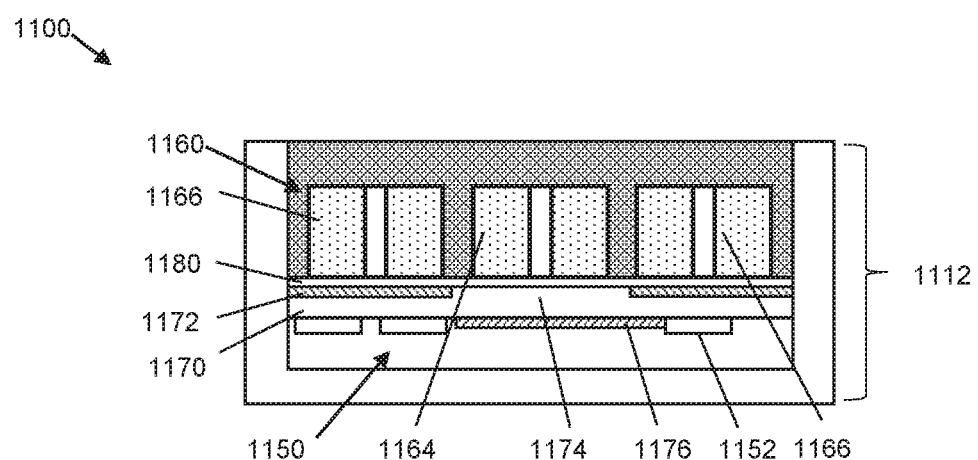
FIG. 11 is a cross-sectional, side view of a portion of a portable microwave heating apparatus, in accordance with yet another example embodiment.

As mentioned previously, alternate embodiments of microwave heating apparatus may include dielectric resonators that are aperture coupled to an RF signal source, rather than being coupled through a feed (e.g., feed 968, FIG. 9) that is positioned within an exciter resonator (e.g., resonator 964) of the DRA array. For example, FIG. 11 is a cross-sectional, side view of a portion of a portable microwave heating apparatus 1100, which includes an aperture coupled DRA array 1160, in accordance with yet another example embodiment. More specifically, the portion of the microwave heating apparatus 1100 corresponds to a base portion 1112 of the apparatus 1100.

The base portion 1112 of the apparatus 1100 is similar to base portion 912 (FIG. 9), in that the assembly includes the DRA array 1160 and a substrate 1170. The DRA array 1160 may include one or more exciter resonators 1164 and adjacent parasitic resonators 1166, where the parasitic resonators 1166 are closely capacitively coupled to the exciter resonator(s) 1164, as previously described. As described in conjunction with FIG. 5, the exciter and parasitic resonators 1164, 1166 may be coupled to a DRA array substrate 1180 (e.g., substrate 530, FIG. 5), which is slidably engaged with the first surface of the electronics substrate 1170 (e.g., with the ground plane 1172).

The substrate 1170 includes a conductive ground plane 1172 on or proximate to a first surface of the substrate 1170 (e.g., the upper surface in FIG. 11), and one or more other conductive layers, some of which may be patterned to provide electrical interconnects between various components mounted to the substrate 1170. For example, components corresponding to the system controller, portions of the user interface, the power supply, and the microwave power generation module 1150, may be mounted to a second surface of the substrate 1170 (e.g., the lower surface in FIG. 11), in an embodiment, and those components may be electrically coupled to each other through patterned conductive layers on or below the second surface.

According to an embodiment, the ground plane 1172 includes an opening or aperture 1174 underlying the exciter resonator(s) 1164. In addition, a microstrip line 1176 or other conductive structure on or below a surface (e.g., the lower surface, in FIG. 11) of the electronics substrate 1170 underlies the aperture 1174 in the ground plane 1172, and also underlies the exciter resonator 1164.

The microstrip line 1176 is electrically coupled to an output of the oscillator subsystem (e.g., oscillator subsystem 352, FIG. 3), and more particularly to an output (e.g., a drain terminal) of a power transistor 1152 of the oscillator subsystem, in an embodiment. When the microstrip line 1176 is provided with a suitable RF signal, the microstrip line 1176 produces electromagnetic energy that is coupled through the electronics substrate 1170, and more particularly through the aperture 1174 in the ground plane 1172, to the exciter resonator 1164. When the coupled RF energy is sufficient to cause the exciter resonator 1164 to resonate and produce its own e-fields, those e-fields may directly impinge on the parasitic resonators 1166. The parasitic resonators 1166, in turn, may resonate and produce additional e-fields. Once again, the e-fields produced by the exciter resonator 1164 and the parasitic resonators 1166 may extend into and couple with a chamber (not illustrated) positioned above the base portion 1112.

Various embodiments of differently configured DRA arrays will now be described in conjunction with FIGS. 12-17. For example, FIG. 12 is a top view of a DRA array 1200 suitable for use in a microwave heating apparatus, in accordance with another example embodiment. Similar to the DRA array 500 of FIG. 5, DRA array 1200 includes seven dielectric resonators 1210, 1220 coupled to a substrate 1230, including a center exciter resonator 1210 and adjacent parasitic resonators 1220. The substrate 1230 may be substantially similar to substrate 530 (FIG. 5), including the variations of substrate 530 discussed above. In one embodiment, a feed 1250 configured to carry an RF signal is positioned within the central hole of the center or exciter dielectric resonator 1210. So configured, the exciter resonator 1210 and the feed 1250 form a DRA. In an alternate embodiment, the exciter resonator 1210 alternatively may be aperture coupled to a microstrip line 1260 or other conductive structure, which instead may be used to carry an RF signal for exciting the exciter resonator 1210. In addition or alternatively, an exciter resonator may be excited by a feed that is placed in a location other than a center hole, and/or multiple feeds may be used to excite a dielectric resonator.

As with DRA array 500, when an appropriate RF signal is carried by the feed 1250 or microstrip line 1260, the signal will cause the exciter resonator 1210 to resonate at its resonant frequency. This, in turn, will cause the exciter resonator 1210 to produce a primary e-field around the circumference of the exciter resonator 1210 (e.g., e-field 440, FIG. 4). In addition, the exciter resonator 1210 may produce a secondary e-field extending orthogonally upward from the top surface of the exciter resonator 1210 (e.g., e-field 442, FIG. 4).

In contrast with DRA 500, the exciter resonator 1210 and the adjacent, parasitic dielectric resonators 1220 are even more closely capacitively coupled with each other by positioning the exciter and parasitic resonators 1210, 1220 so that they are actually touching each other. More specifically, the distance between the sidewalls of the dielectric resonators 1210, 1220 is zero, making the dielectric resonators 1210, 1220 extremely closely capacitively coupled when a suitable excitation signal is provided to the feed 1250 or 1260.

When the exciter and parasitic resonators 1210, 1220 are touching, as described above, the circumferential or primary e-field produced by the exciter resonator 1210 (e.g., e-field 440, FIG. 4) may directly impinge upon the adjacent parasitic resonators 1220. This, in turn, may cause the parasitic resonators 1220 to resonate at their respective resonant frequencies.

Figure 13:
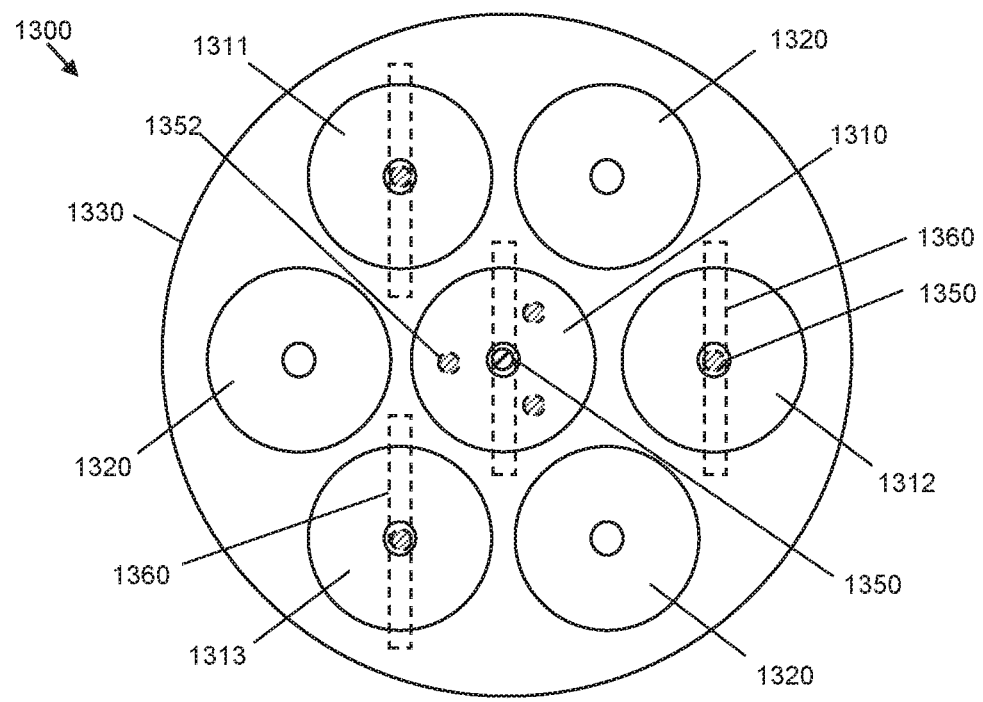
FIG. 13 is a top view of a DRA array suitable for use in a microwave heating apparatus, in accordance with another example embodiment.

FIG. 13 is a top view of a DRA array 1300 suitable for use in a microwave heating apparatus, in accordance with another example embodiment. DRA array 1300 includes seven dielectric resonators 1310-1313, 1320 coupled to a substrate 1330, including multiple exciter resonators 1310-1313 and adjacent parasitic resonators 1320. The substrate 1330 may be substantially similar to substrate 530 (FIG. 5), including the variations of substrate 530 discussed above. In the illustrated embodiment, multiple feeds 1350 configured to carry one or more RF signals are positioned within the central holes of the multiple exciter resonators 1310-1313. So configured, each of the exciter resonators 1310-1313 and its associated feed 1350 form a DRA. Thus, the DRA array 1300 includes multiple DRAs, in contrast with the embodiment of FIG. 5, in which the DRA array 500 included only a single DRA. In alternate embodiments, one or more of the exciter resonators 1310-1313 alternatively may be aperture coupled to a microstrip line 1360 or some other conductive structure, which instead may be used to carry an RF signal for exciting the exciter resonator 1310-1313. In still other alternate embodiments, as is indicated for the center exciter resonator 1310, multiple feeds 1350, 1352 may be positioned at different locations within a given dielectric resonator 1310-1313. In some embodiments, different feeds may be coupled to (or configured to excite) up to all of the dielectric resonators in an array (e.g., all of the dielectric resonators may be exciter resonators).

As with DRA array 500, when an appropriate RF signal is carried by a feed 1350, 1352 or microstrip line 1360, the signal will cause the corresponding exciter resonator 1310-1313 to resonate at its resonant frequency. This, in turn, will cause the exciter resonator 1310-1313 to produce a primary e-field around the circumference of the exciter resonator 1310-1313 (e.g., e-field 440, FIG. 4). In addition, the exciter resonator 1310-1313 may produce a secondary e-field extending orthogonally upward from the top surface of the exciter resonator 1310-1313 (e.g., e-field 442, FIG. 4). In some cases, an exciter resonator 1310-1313 may be directly adjacent to (i.e., closely capacitively coupled with no intervening structures) another exciter resonator 1310-1313. In such cases, the adjacent exciter resonators 1310-1313 may function as both exciter resonators and as parasitic resonators. For example, considering resonators 1310 and 1311, which are directly adjacent to each other, when exciter resonator 1310 is active and producing a circumferential e-field (e.g., e-field 440, FIG. 4), the e-field may directly impinge upon exciter resonator 1311. At such times, exciter resonator 1311 may function as a parasitic resonator. If exciter resonator 1311 also is receiving excitation from the feed 1350 or microstrip line 1360 associated with exciter resonator 1311, then exciter resonator 1311 simultaneously may be functioning as both an exciter resonator and a parasitic resonator.

According to an embodiment, all of the feeds 1350, 1352 and/or microstrip lines 1360 may receive the same RF signal. In various alternate embodiments, the feeds 1350, 1352 and/or microstrip lines 1360 may receive different RF signals (e.g., RF signals at different frequencies and/or power levels), and/or provision of the RF signals to the feeds 1350, 1352 and/or microstrip lines 1360 may be phased. For example, during a first time duration, a first subset of the exciter resonators 1310 may be provided with excitation from their associated feeds 1350 and/or 1352 and/or microstrip lines 1360, while a second and different subset of the exciter resonators 1310 may receive no excitation or different excitation from their associated feeds 1350 and/or 1352 and/or microstrip lines 1360. During a second time duration, the excitation provided to the first subset of the exciter resonators 1310 may be removed or altered, and the excitation provided to the second subset of exciter resonators 1310 may either remain the same, or also be removed or altered. In this way, the cumulative e-fields produced by the DRA array 1300 may be varied over time in direction, intensity, frequency, or otherwise. Said another way, by providing multiple feeds 1350, 1352 and/or microstrip lines 1360 and exciting them sequentially or in various combinations, a continuously or incrementally steerable beam or beams may be formed. More specifically, a beam of microwave energy may be steered in azimuth and/or elevation by activating the multiple feeds 1350, 1352 and/or microstrip lines 1360 individually or in combination.

Figure 14:
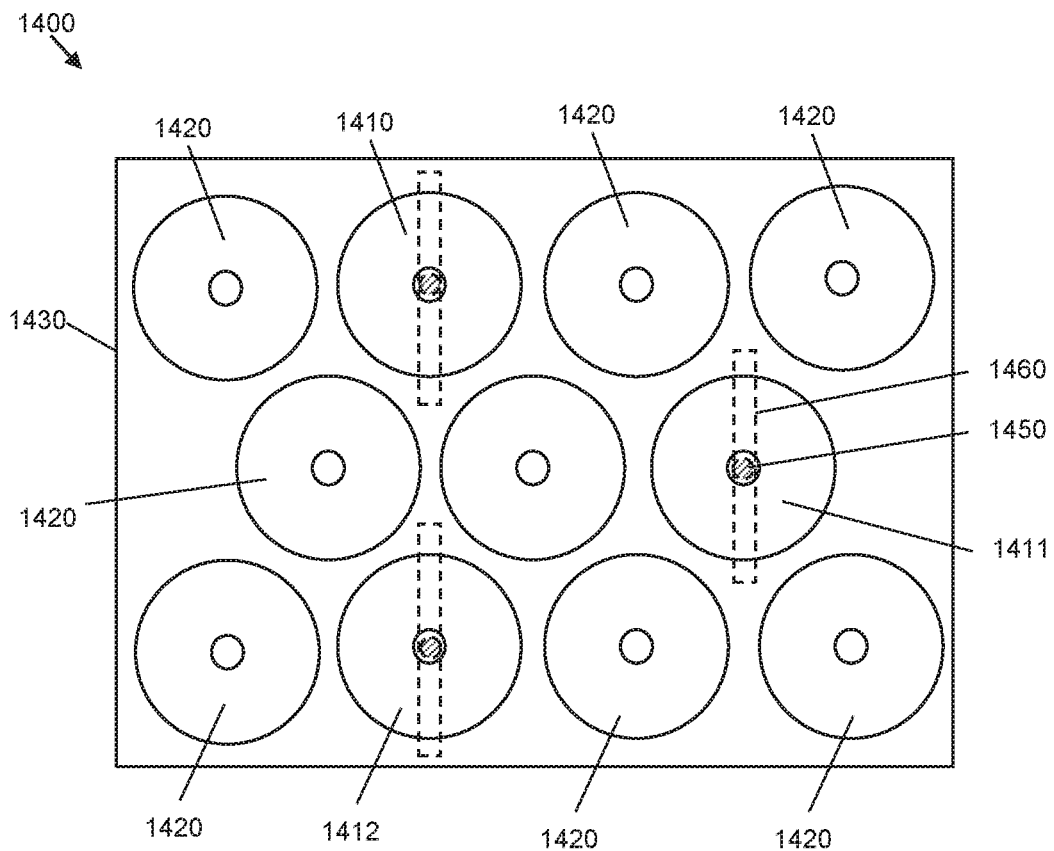
FIG. 14 is a top view of a DRA array suitable for use in a microwave heating apparatus, in accordance with another example embodiment.

FIG. 14 is a top view of a DRA array 1400 suitable for use in a microwave heating apparatus, in accordance with yet another example embodiment. Although each of the previously-described DRA arrays have been indicated for use in a microwave heating system that includes a heating chamber (e.g., chamber 920, FIG. 9) with a circular cross-section, the DRA array 1400 of FIG. 14 may be particularly well suited for use in a microwave heating apparatus that includes a heating chamber with a rectangular cross-section. In other words, the DRA array 1400 may be well suited for use in a system that includes a heating chamber that essentially functions as a rectangular waveguide with a blocked end.

In the illustrated embodiment, DRA array 1400 includes eleven dielectric resonators 1410-1412, 1420 coupled to a rectangular substrate 1430, including multiple exciter resonators 1410-1412 and adjacent parasitic resonators 1420. Except for the shape, the substrate 1430 may be substantially similar to substrate 530 (FIG. 5), including the variations of substrate 530 discussed above. In the illustrated embodiment, multiple feeds 1450 configured to carry one or more RF signals are positioned within the central holes of the multiple exciter resonators 1410-1412. So configured, each of the exciter resonators 1410-1412 and its associated feed 1450 form a DRA. Thus, the DRA array 1400 includes multiple DRAs. In alternate embodiments, one or more of the exciter resonators 1410-1412 alternatively may be aperture coupled to a microstrip line 1460 or some other conductive structure, which instead may be used to carry an RF signal for exciting the exciter resonator 1410-1412.

As with DRA array 500, when an appropriate RF signal is carried by a feed 1450 or microstrip line 1460, the signal will cause the corresponding exciter resonator 1410-1412 to resonate at its resonant frequency. This, in turn, will cause the exciter resonator 1410-1412 to produce a primary e-field around the circumference of the exciter resonator 1410-1412 (e.g., e-field 440, FIG. 4). In addition, the exciter resonator 1410-1412 may produce a secondary e-field extending orthogonally upward from the top surface of the exciter resonator 1410-1412 (e.g., e-field 442, FIG. 4).

As with the embodiment of FIG. 13, and according to an embodiment, all of the feeds 1450 and/or microstrip lines 1460 may receive the same RF signal. In various alternate embodiments, the feeds 1450 and/or microstrip lines 1460 may receive different RF signals (e.g., RF signals at different frequencies and/or power levels), and/or provision of the RF signals to the feeds 1450 and/or microstrip lines 1460 may be phased.

Figure 15:
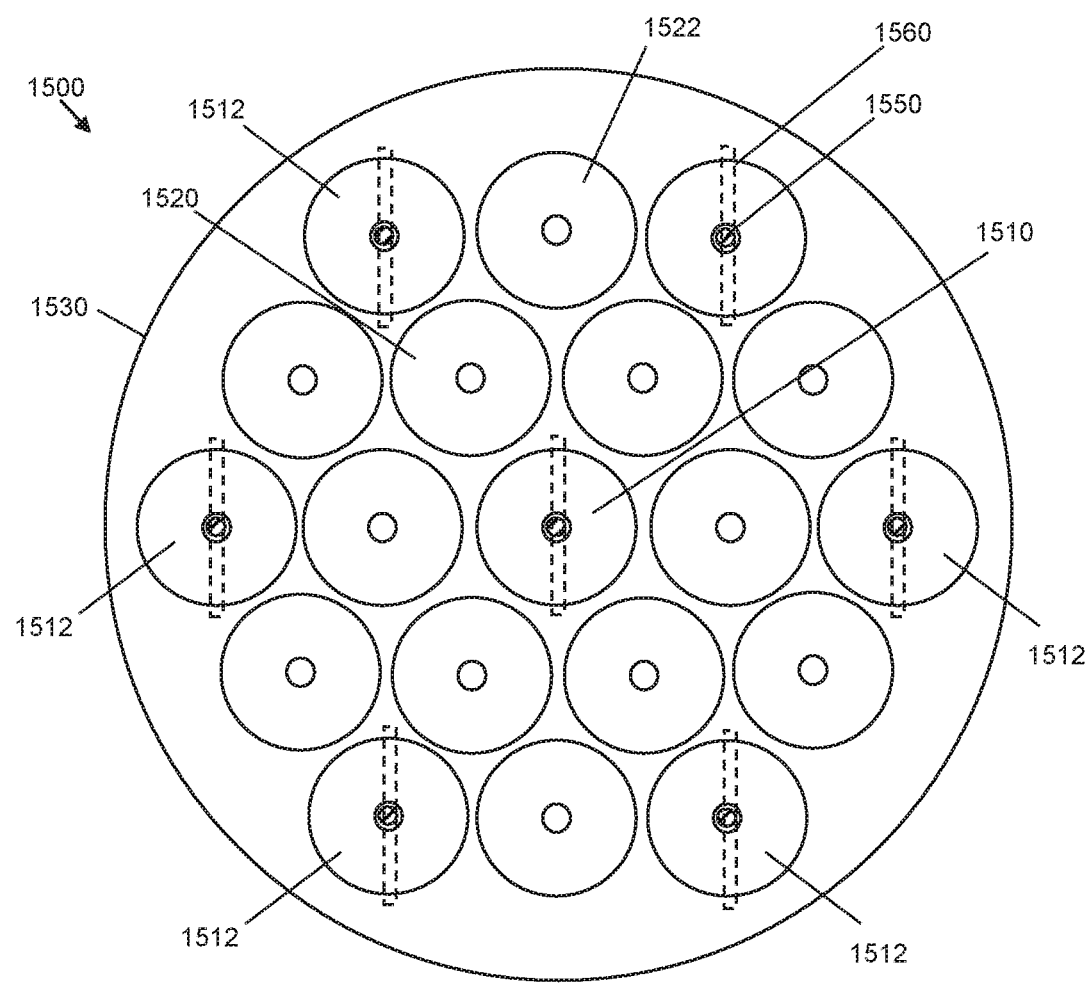
FIG. 15 is a top view of a DRA array suitable for use in a microwave heating apparatus, in accordance with yet another example embodiment.

FIG. 15 is a top view of a DRA array 1500 suitable for use in a microwave heating apparatus, in accordance with yet another example embodiment. DRA array 1500 is similar to DRA array 1300 in FIG. 13, except that DRA array 1500 includes an extra circumferentially placed row of dielectric resonators, rather than including only a single row of circumferentially placed dielectric resonators as in the DRA array 1300 of FIG. 13. More specifically, DRA array 1500 includes nineteen dielectric resonators 1510, 1512, 1520, 1522 coupled to a substrate 1530, including multiple exciter resonators 1510, 1512 and adjacent parasitic resonators 1520, 1522. More specifically, DRA array 1500 includes a centrally positioned exciter resonator 1510, a first circumferential row of parasitic resonators 1520 that are directly adjacent to the central exciter resonator 1510, and a second circumferential row of alternating exciter resonators 1512 and parasitic resonators 1522.

As with the DRA array 1300 of FIG. 13, multiple feeds 1550 configured to carry one or more RF signals are positioned within the central holes of the multiple exciter resonators 1510, 1512. So configured, each of the exciter resonators 1510, 1512 and its associated feed 1550 form a DRA. In alternate embodiments, one or more of the exciter resonators 1510, 1512 alternatively may be aperture coupled to a microstrip line 1560 or some other conductive structure, which instead may be used to carry an RF signal for exciting the exciter resonator 1510, 1512.

As with DRA array 500, when an appropriate RF signal is carried by a feed 1550 or microstrip line 1560, the signal will cause the corresponding exciter resonator 1510, 1512 to resonate at its resonant frequency. This, in turn, will cause the exciter resonator 1510, 1512 to produce a primary e-field around the circumference of the exciter resonator 1510, 1512 (e.g., e-field 440, FIG. 4). In addition, the exciter resonator 1510, 1512 may produce a secondary e-field extending orthogonally upward from the top surface of the exciter resonator 1510, 1512 (e.g., e-field 442, FIG. 4).

According to an embodiment, all of the feeds 1550 and/or microstrip lines 1560 may receive the same RF signal. In various alternate embodiments, the feeds 1550 and/or microstrip lines 1560 may receive different RF signals (e.g., RF signals at different frequencies and/or power levels), and/or provision of the RF signals to the feeds 1550 and/or microstrip lines 1560 may be phased.

Figure 16:
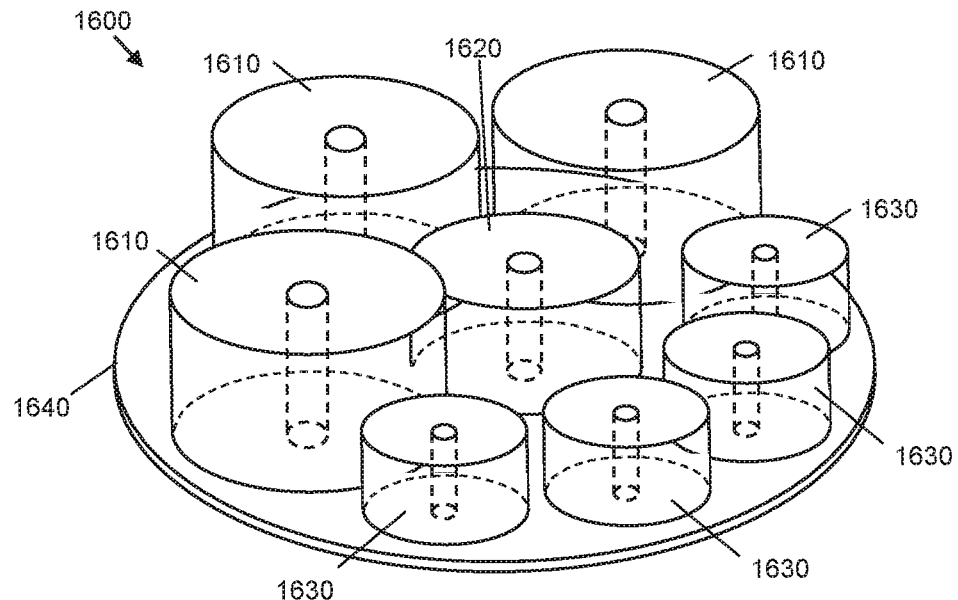
FIG. 16 is a perspective view of a DRA array suitable for use in a microwave heating apparatus, in accordance with yet another example embodiment.

In some alternate embodiments, a DRA array may include dielectric resonators that resonate at different frequencies. As discussed previously, this may be accomplished by using dielectric resonators of different sizes, dielectric resonators of different shapes, and/or dielectric resonators with different dielectric constants, for example. FIG. 16 is a perspective view of a DRA array 1600 suitable for use in a microwave heating apparatus, which includes dielectric resonators 1610, 1620, 1630 of different sizes, in accordance with yet another example embodiment. Similar to the DRA array 500 of FIG. 5, DRA array 1600 includes seven dielectric resonators 1610, 1620, 1630 coupled to a substrate 1640, including at least one exciter resonator (e.g., any one or more of resonators 1610, 1620, 1630) and adjacent parasitic resonators (e.g., any other one or more of resonators 1610, 1620, 1630). The substrate 1640 may be substantially similar to substrate 530 (FIG. 5), including the variations of substrate 530 discussed above. In one embodiment, a feed (not illustrated) configured to carry an RF signal is positioned within the central hole of each exciter dielectric resonator. So configured, the exciter resonator and the feed form a DRA. In an alternate embodiment, each exciter resonator alternatively may be aperture coupled to a microstrip line or other conductive structure, which instead may be used to carry an RF signal for exciting the exciter resonator. In addition or alternatively, an exciter resonator may be excited by a feed that is placed in a location other than a center hole, and/or multiple feeds may be used to excite a dielectric resonator.

As with DRA array 500, when an appropriate RF signal is carried by the feed or microstrip line, the signal will cause the exciter resonator to resonate at its resonant frequency. This, in turn, will cause the exciter resonator to produce a primary e-field around the circumference of the exciter resonator (e.g., e-field 440, FIG. 4). In addition, the exciter resonator may produce a secondary e-field extending orthogonally upward from the top surface of the exciter resonator (e.g., e-field 442, FIG. 4).

In contrast with DRA 500, the dielectric resonators 1610, 1620, 1630 are of different sizes. Assuming that the dielectric resonators 1610, 1620, 1630 are formed from material(s) having the same dielectric constant, the size difference results in the dielectric resonators 1610, 1620, 1630 resonating at different resonant frequencies. For example, the largest dielectric resonators 1610 may resonate at a first resonant frequency, the intermediate sized dielectric resonator 1620 may resonate at a second, higher resonant frequency, and the smallest dielectric resonators 1630 may resonate at a third, even higher resonant frequency. As a result of the differences in the resonant frequencies, the cumulative e-field emanating from the DRA array 1600 may be non-orthogonal to the upper surfaces (e.g., upper surface 1640) of the dielectric resonators 1610, 1620, 1630.

Although e-field steering is accomplished in the DRA array 1600 of FIG. 16 by incorporating differently sized dielectric resonators 1610, 1620, 1630 (thus resonators with different resonant frequencies) into the array 1600, similar beam-steering effects may be accomplished in other ways. For example, e-field steering alternatively may be accomplished by incorporating dielectric resonators with different dielectric constants into an array, by incorporating differently-shaped dielectric resonators into an array, or by varying the spacing, and thus the strength of the capacitive coupling, between sets of adjacent dielectric resonators. By incorporating dielectric resonators with various resonant frequencies into a DRA array, a system may be designed in which the cumulative e-field is directed in one or more directions other than orthogonally from the top surfaces of the dielectric resonators.

Figure 17:
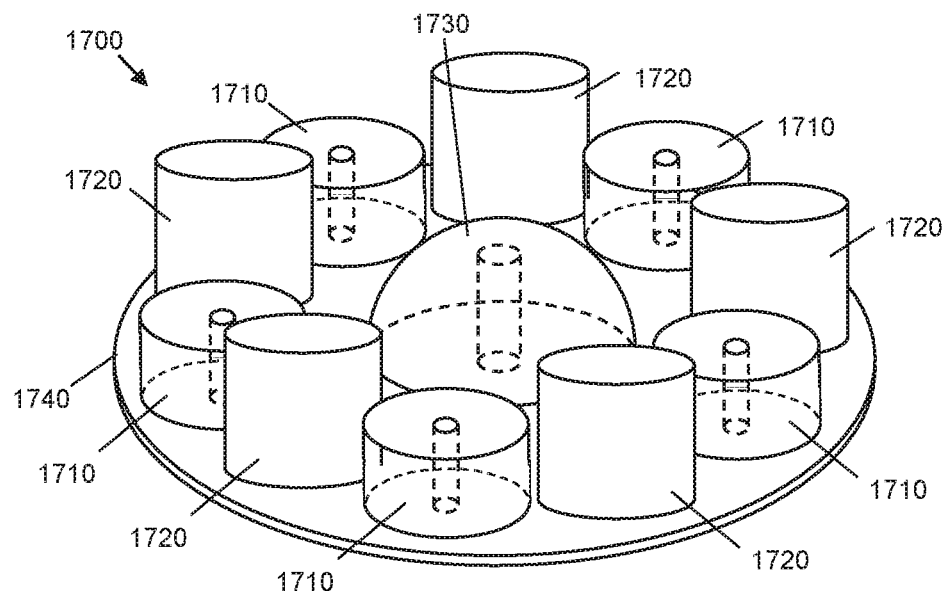
FIG. 17 is a perspective view of a DRA array suitable for use in a microwave heating apparatus, in accordance with yet another example embodiment.

In some alternate embodiments, a DRA array may include dielectric resonators that have different physical configurations, and thus dielectric resonators that resonate at different frequencies and/or have different e-field distributions. For example, FIG. 17 is a perspective view of a DRA array 1700 suitable for use in a microwave heating apparatus, which includes dielectric resonators 1710, 1720, 1730 of different physical configurations, in accordance with yet another example embodiment. DRA array 1700 includes eleven dielectric resonators 1710, 1720, 1730 coupled to a substrate 1740, including at least one exciter resonator (e.g., any one or more of resonators 1710, 1720, 1730) and adjacent parasitic resonators (e.g., any other one or more of resonators 1710, 1720, 1730). The substrate 1740 may be substantially similar to substrate 530 (FIG. 5), including the variations of substrate 530 discussed above. In one embodiment, a feed (not illustrated) configured to carry an RF signal is positioned within the central hole of each exciter dielectric resonator. So configured, the exciter resonator and the feed form a DRA. In an alternate embodiment, each exciter resonator alternatively may be aperture coupled to a microstrip line or other conductive structure, which instead may be used to carry an RF signal for exciting the exciter resonator. In addition or alternatively, an exciter resonator may be excited by a feed that is placed in a location other than a center hole, and/or multiple feeds may be used to excite a dielectric resonator.

As with DRA array 500, when an appropriate RF signal is carried by the feed or microstrip line, the signal will cause the exciter resonator to resonate at its resonant frequency. This, in turn, will cause the exciter resonator to produce one or more e-fields that radiate outward from the resonator.

In contrast with DRA 500, the dielectric resonators 1710, 1720, 1730 are of different physical configurations. More specifically, in the illustrated embodiment, the first dielectric resonators 1710 have a substantially cylindrical shape with a central hole, the second dielectric resonators 1720 have a substantially cylindrical shape with no central hole, and the third dielectric resonator 1730 has a dome shape with a central hole. Assuming that the dielectric resonators 1710, 1720, 1730 are formed from material(s) having the same dielectric constant, the physical configuration differences result in the dielectric resonators 1710, 1720, 1730 resonating at different resonant frequencies and/or producing e-fields that have different distributions.

The embodiment of FIG. 17 illustrates that a variety of differently configured dielectric resonators may be utilized in various embodiments of a DRA array. To illustrate the point even further, FIGS. 18-23 are perspective views of dielectric resonators 1800, 1900, 2000, 2100, 2200, 2300 with various physical configurations, and which may be used in a DRA array. More specifically, dielectric resonator 1800 (FIG. 18) has a cylindrical shape with no central hole, dielectric resonator 1900 (FIG. 19) has a flattened disk shape with a central hole, dielectric resonator 2000 (FIG. 20) has a cone shape with a central hole, dielectric resonator 2100 (FIG. 21) has a parallelepiped shape with a central hole, dielectric resonator 2200 (FIG. 22) has a spherical shape with a central hole, and dielectric resonator 2300 (FIG. 23) has a dome shape with no central hole. Any of a wide variety of differently configured dielectric resonators with or without central holes, or with other openings, alternatively may be used in various embodiments.

As indicated previously, another alternate embodiment of a microwave heating apparatus may include more than one DRA array. For example, in FIG. 9, an additional DRA array 962 is depicted in the lid 916 of microwave heating apparatus 900. In that embodiment, the two included DRA arrays 960, 962 are configured to direct beams of electromagnetic energy along the same axis, which specifically is an axis running perpendicular to the bottom and top surfaces 924, 926 of the heating chamber 920. In an alternate embodiment, a microwave heating apparatus may include multiple DRA arrays that direct beams of electromagnetic energy in directions that are not co-linear. For example, FIG. 19 is a cross-sectional, side view of a microwave heating apparatus 1900 that includes first and second DRA arrays 2460, 2462 that direct beams of electromagnetic energy in orthogonal directions, in accordance with another example embodiment.

Figure 24:
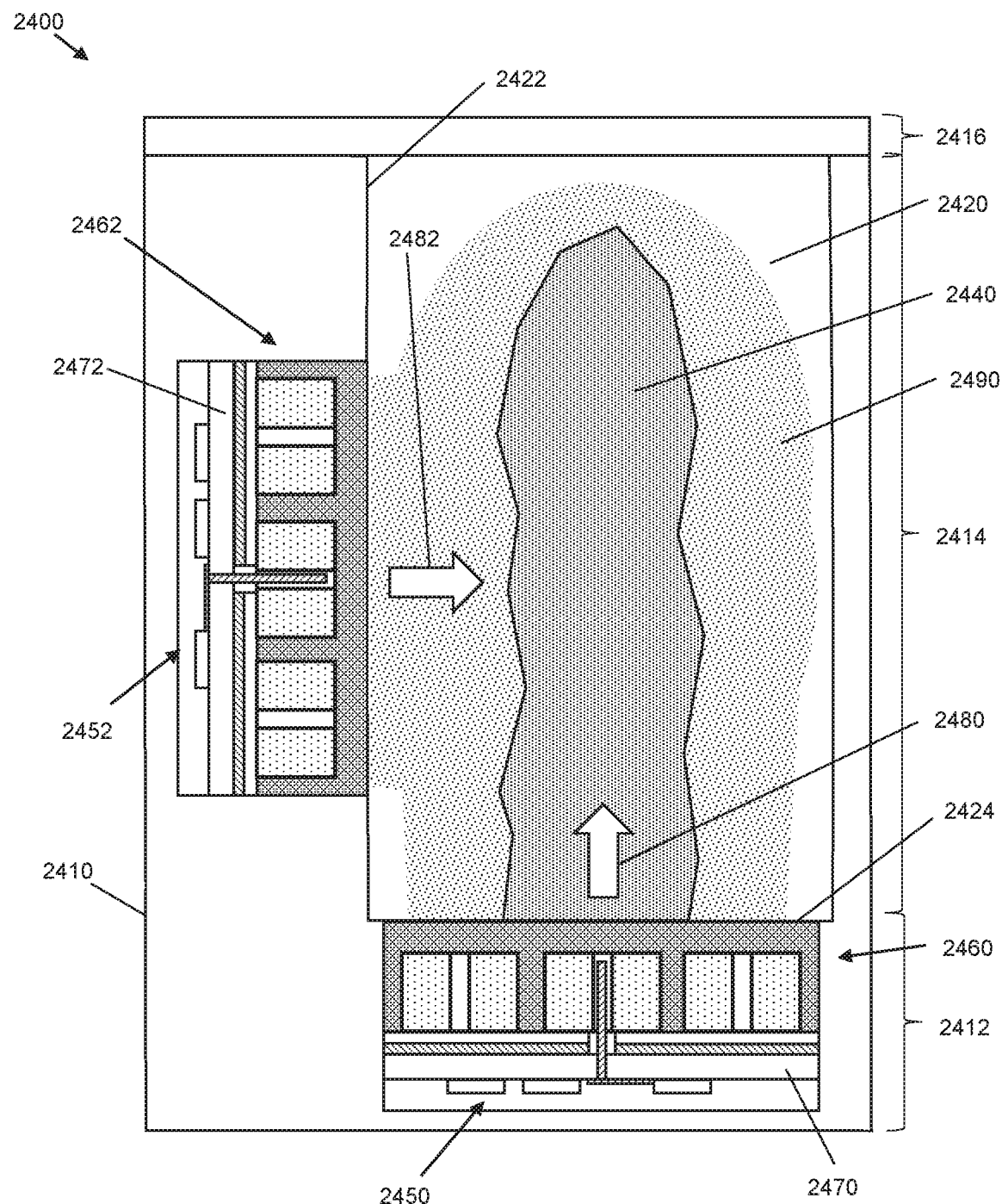
FIG. 24 is a cross-sectional, side view of a portable microwave heating apparatus, in accordance with another example embodiment.

Similar to the microwave heating apparatus 900 of FIG. 9, microwave heating apparatus 2400 includes a housing 2410, a heating chamber 2420, a system controller (e.g., system controller 310, not illustrated in FIG. 24), a user interface (e.g., user interface 330, not illustrated in FIG. 24), and a power supply system (e.g., power supply system 340, not illustrated in FIG. 24). In addition, the housing 2410 includes a base portion 2412, a chamber portion 2414, and a lid 2416 (which is in a closed state in FIG. 24), in an embodiment. In contrast with the microwave heating apparatus 900 of FIG. 9, microwave heating apparatus 2400 includes two microwave power generation modules 2450, 2452 (e.g., two instances of module 350, FIG. 3), and two DRA arrays 2460, 2462 (e.g., two instances of DRA array 360, 500, FIGS. 3, 5) that are arranged orthogonally, with respect to each other. More specifically, a first DRA array 2460 is positioned within a base portion 2412 of the housing 2410, and a second DRA array 2462 is positioned within a sidewall 2422 of the chamber portion 2414 of the apparatus 2400.

The heating chamber 2420 also is located within the chamber portion 2414 of the housing 2410. FIG. 24 shows a load 2440 (e.g., a food load or other load) within the chamber 2420. Once again, the heating chamber 2420 is an enclosed air cavity, which essentially functions as a waveguide with a blocked end, as described previously.

According to an embodiment, the base portion 2412 of the housing 2410 contains the first DRA array 2460 and an electronics substrate 2470 that houses a first microwave power generation module 2450. Similarly, the chamber portion 2414 of the housing 2410 contains the second DRA array 2462 and an electronics substrate 2472 that houses a second microwave power generation module 2452. The first microwave power generation module 2450 is configured to provide an RF excitation signal to the first DRA array 2460 (e.g., through a feed positioned in an exciter resonator or through capacitive coupling), which causes the first DRA array 2460 to produce a beam of electromagnetic energy in a direction that is orthogonal to the bottom surface 2424 of the chamber 2420, which direction generally is indicated by arrow 2480. Similarly, the second microwave power generation module 2452 is configured to provide an RF excitation signal to the second DRA array 2462 (e.g., through a feed positioned in an exciter resonator or through capacitive coupling), which causes the second DRA array 2462 to produce a beam of electromagnetic energy in a direction that is orthogonal to the chamber sidewall 2422, which direction is generally indicated by arrow 2482. As is apparent from FIG. 24, the beams of electromagnetic energy produced by the first and second DRA arrays 2460, 2462 have substantially orthogonal orientations. In addition, although the first and second DRA arrays 2460, 2462 may be operated at substantially the same frequency, they alternatively may be operated at different frequencies to provide more broadband energy coupling to the load 2440 within the chamber 2420.

Figure 25:
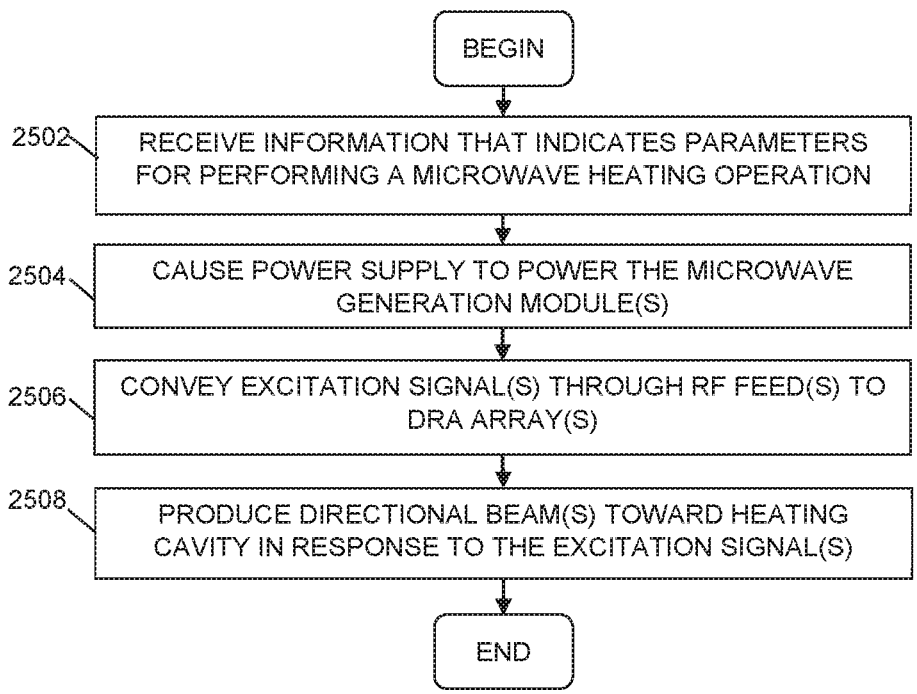
FIG. 25 is a flowchart of a method of operating a microwave system that includes a DRA array, in accordance with an example embodiment.

FIG. 25 is a flowchart of a method of operating a microwave system (e.g., system 100, 300, 900, 2400) that includes one or more DRA arrays, in accordance with an example embodiment. The method begins, in block 2502, when the system controller (e.g., system controller 310, FIG. 3) receives information that indicates parameters for performing a microwave heating operation. For example, the information may be derived from user inputs provided through a user interface (e.g., user interface 330, FIG. 3), and the information may convey the duration of a heating operation, the power level of a heating operation, and/or other parameters relating to the heating operation.

In block 2504, the system controller causes a power supply (e.g., power supply 340, FIG. 1) to provide power to one or more microwave generation modules (e.g., module 350, FIG. 3) in a way that will cause the microwave generation module(s) to produce one or more excitation signals that are consistent with the parameters specified for the heating operation.

According to an embodiment, in block 2506, each excitation signal may be conveyed through an RF feed (e.g., feed 550, FIG. 5) or through a microstrip line (e.g., microstrip line 1176, FIG. 11) to a DRA array (e.g., DRA array 500, 960, 1060, 1160, 1200, 1300, 1400, 1500, 1600, 1700, 2460). The DRA array, in response, produces a directional electromagnetic energy beam, in block 2508, which is oriented toward a heating chamber (e.g., heating chamber 920) of the microwave system. As discussed previously, the chamber may contain a near-field load (e.g., load 940, 2440). The DRA array continues to produce the directional electromagnetic energy beam until provision of the excitation signal is discontinued, at which point the method ends.

Figure 26:
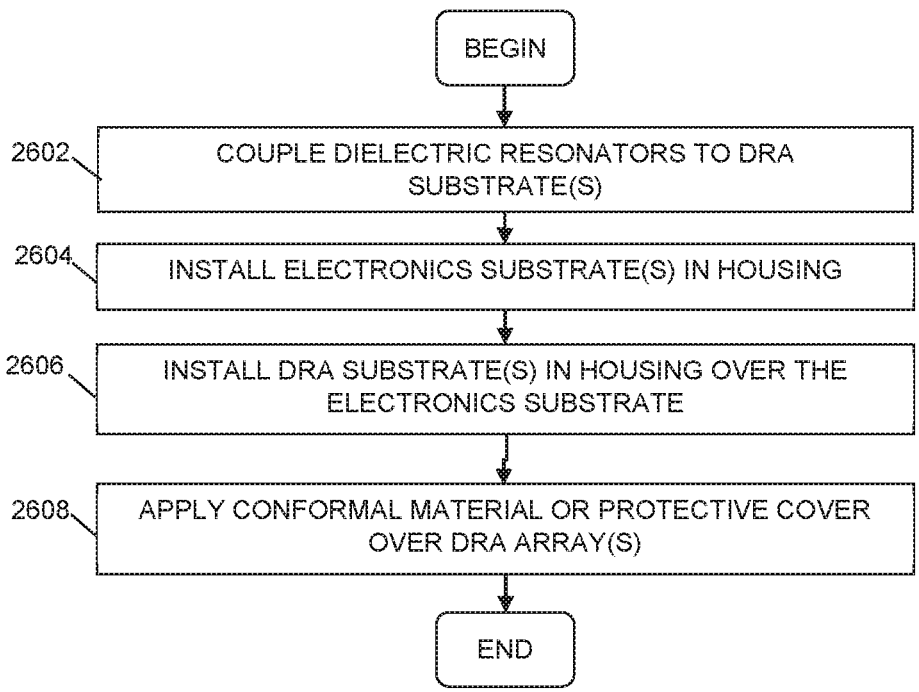
FIG. 26 is a flowchart of a method of manufacturing a microwave system that includes a DRA array, in accordance with an example embodiment.

FIG. 26 is a flowchart of a method of manufacturing a microwave system (e.g., system 100, 300, 900, 2400) that includes one or more DRA arrays, in accordance with an example embodiment. The method begins, in block 2602, by coupling a plurality of dielectric resonators (e.g., dielectric resonators 964, 966) to a DRA substrate (e.g., DRA substrate 980) to form a DRA substrate assembly. In the DRA substrate assembly, the distance between an exciter dielectric resonator and adjacent dielectric resonators ensures that the exciter and adjacent dielectric resonators will be closely capacitively coupled in the presence of an excitation signal from a feed (e.g., the distance is less than one fifth or one tenth of a wavelength of the resonant frequency of the exciter dielectric resonator).

In block 2604, one or more electronics substrates (e.g., substrate 970) are installed into a housing (e.g., into a base portion or other portion of a housing). The housing includes a heating chamber (e.g., chamber 920), which is configured to contain a load (e.g., load 940) that is to be heated or defrosted. According to an embodiment, each electronic substrate houses a microwave generation module (e.g., module 950), including one or more feed structures (e.g., feed 968 or microstrip line 1174). In addition, each electronic substrate includes a ground plane (e.g., ground plane 972).

In block 2606, the DRA substrate assembly is installed in the housing over the electronics substrate so that the DRA substrate is positioned between the ground plane and the heating chamber, and so that the one or more feed structures are in sufficient proximity to the exciter dielectric resonator (and possibly other dielectric resonators in the array) to be capable of exciting the resonator(s) into resonance when supplied with a suitable RF excitation signal from the microwave generation module. In block 2608, the DRA array is separated from the chamber (e.g., to protect the DRA array) by applying a conformal material (e.g., conformal material 1082) over the DRA array, or by placing a protective cover (e.g., cover 982) over the DRA array.

For the sake of brevity, conventional techniques related to resonators, amplifiers, biasing, load modulation, impedance matching, power splitters and/or power combiners, microwave applications, and other functional aspects of the systems (and the individual operating components of the systems) may not be described in detail herein. The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

An embodiment of a microwave heating apparatus includes a solid state microwave energy source, a first dielectric resonator antenna that includes a first exciter dielectric resonator and a first feed structure in proximity to the first exciter dielectric resonator, and one or more second dielectric resonators. The first exciter dielectric resonator has a top surface and an opposed bottom surface. The first feed structure is electrically coupled to the microwave energy source to receive a first excitation signal from the microwave energy source. The first exciter dielectric resonator is configured to produce a first electric field in response to the excitation signal provided to the first feed structure. The one or more second dielectric resonators are positioned within a distance of the first exciter dielectric resonator to form a dielectric resonator antenna array. The distance is selected so that each of the second dielectric resonators is closely capacitively coupled with the first exciter dielectric resonator when the excitation signal is provided.

According to a further embodiment, when the excitation signal is provided, the first electric field produced by the first exciter dielectric resonator directly impinges on each of the second dielectric resonators, causing each of the second dielectric resonators to produce a second electric field in response to impingement of the first electric field. According to yet a further embodiment, each of the one or more second dielectric resonators is a parasitic dielectric resonator that does not receive an excitation signal directly from a feed structure, but instead produces the second electric field solely in response to the impingement of the first electric field. According to another further embodiment, the first exciter dielectric resonator and the second dielectric resonators are arranged in a co-planar configuration so that a portion of the circumferential electric field directly impinges on the second dielectric resonators. According to another further embodiment, the distance is less than one fifth of a wavelength of a resonant frequency of the first exciter dielectric resonator. According to yet another further embodiment, the distance is between zero millimeters and 12.5 millimeters.

Another embodiment of a microwave heating apparatus includes a chamber, a solid state microwave energy source, a first dielectric resonator antenna that includes a first exciter dielectric resonator and a first feed structure in proximity to the first exciter dielectric resonator, and one or more second dielectric resonators. The chamber is configured to contain a load, and the chamber is defined in part by a first chamber wall having an interior chamber-wall surface and an exterior chamber-wall surface. The first exciter dielectric resonator has a top surface and an opposed bottom surface. The first feed structure is electrically coupled to the microwave energy source to receive a first excitation signal from the microwave energy source, and the first exciter dielectric resonator is configured to produce a first electric field in response to the excitation signal provided to the first feed structure. The one or more second dielectric resonators are positioned within a distance of the first exciter dielectric resonator to form a dielectric resonator antenna array. The distance is selected so that each of the second dielectric resonators is closely capacitively coupled with the first exciter dielectric resonator when the excitation signal is provided.

An embodiment of a method of operating a microwave system that includes a first microwave generation module, includes producing, by the first microwave generation module, a first excitation signal that is conveyed to a first radio frequency (RF) feed structure, where the first RF feed structure is positioned in proximity to a first dielectric resonator. The method also includes producing, by the first dielectric resonator in response to the first excitation signal conveyed by the first RF feed structure, a first electric field that directly impinges upon a second dielectric resonator that is closely capacitively coupled to the first dielectric resonator. The method further includes producing, by the second dielectric resonator in response to impingement of the first electric field, a second electric field, where the second electric field is directed toward a chamber that contains a near-field load.

An embodiment of a method of manufacturing a microwave system includes coupling a first dielectric resonator with a resonant frequency to a first substrate, and coupling one or more additional dielectric resonators to the first substrate so that a distance between the first dielectric resonator and each of the one or more additional dielectric resonators are closely capacitively coupled. The first and additional dielectric resonators form a dielectric resonator antenna array. The method further includes installing a second substrate into a housing, where an RF feed structure is coupled to the second substrate. The housing defines a chamber that is configured as a waveguide with a blocked end. The method further includes installing the first substrate into the housing so that the RF feed structure is in sufficient proximity to the first dielectric resonator to be capable of exciting the first dielectric resonator into resonance when the RF feed structure is supplied with a suitable RF excitation signal.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A microwave heating apparatus comprising:
   a solid state microwave energy source;
   a first dielectric resonator antenna that includes a first exciter dielectric resonator and a first feed structure in proximity to the first exciter dielectric resonator, wherein the first exciter dielectric resonator has a top surface and an opposed bottom surface, wherein the first feed structure is electrically coupled to the microwave energy source to receive a first excitation signal from the microwave energy source, and wherein the first exciter dielectric resonator is configured to produce a first electric field in response to the excitation signal provided to the first feed structure; and
   one or more second dielectric resonators positioned adjacent to a sidewall and within a distance of the first exciter dielectric resonator to form a dielectric resonator antenna array, wherein the distance is selected so that each of the second dielectric resonators is closely capacitively coupled with the first exciter dielectric resonator when the excitation signal is provided, and wherein the distance is less than one fifth of a wavelength of a resonant frequency of the first exciter dielectric resonator.

2. The microwave heating apparatus of claim 1, wherein, when the excitation signal is provided, the first electric field produced by the first exciter dielectric resonator directly impinges on each of the second dielectric resonators, causing each of the second dielectric resonators to produce a second electric field in response to impingement of the first electric field.

3. The microwave heating apparatus of claim 2, wherein each of the one or more second dielectric resonators is a parasitic dielectric resonator that does not receive an excitation signal directly from a feed structure, but instead produces the second electric field solely in response to the impingement of the first electric field.

4. The microwave heating apparatus of claim 1, wherein, when the excitation signal is provided, the first electric field includes a circumferential electric field, and wherein the first exciter dielectric resonator and the second dielectric resonators are arranged in a co-planar configuration so that a portion of the circumferential electric field directly impinges on the second dielectric resonators.

5. The microwave heating apparatus of claim 1, wherein the first feed structure includes a feed that extends into the first exciter dielectric resonator.

6. The microwave heating apparatus of claim 5, wherein the first dielectric resonator antenna includes one or more additional feeds in the first exciter dielectric resonator, wherein the one or more additional feeds are electrically coupled to the microwave energy source to receive one or more additional excitation signals from the microwave energy source.

7. The microwave heating apparatus of claim 1, wherein the first feed structure includes a conductor that is aperture coupled to the first exciter dielectric resonator.

8. The microwave heating apparatus of claim 1, wherein the dielectric resonator antenna array further comprises one or more additional dielectric resonator antennas, wherein each of the one or more additional dielectric resonator antennas includes an additional exciter dielectric resonator and an additional feed structure in proximity to the additional exciter dielectric resonator.

9. The microwave heating apparatus of claim 1, wherein each of the first exciter dielectric resonator and the one or more second dielectric resonators have a shape selected from a cylinder, a disk, a cone, a parallelepiped, a sphere, and a dome.

10. The microwave heating apparatus of claim 1, wherein the distance is between zero millimeters and 12.5 millimeters.

11. The microwave heating apparatus of claim 1, wherein the distance is less than one tenth of the wavelength of the resonant frequency of the first exciter dielectric resonator.

12. The microwave heating apparatus of claim 1, wherein the distance is between zero millimeters and 3.0 millimeters.

13. The microwave heating apparatus of claim 1, further comprising:
    a ground plane positioned at a first side of the dielectric resonator antenna array; and
    a chamber positioned at an opposite side of the dielectric resonator antenna array from the ground plane, wherein the chamber is configured to contain a load.

14. The microwave heating apparatus of claim 13, wherein the chamber would be below cutoff in the absence of the dielectric resonator antenna array.

15. The microwave heating apparatus of claim 1, further comprising a substrate with a first side and a second side, wherein the first exciter dielectric resonator and the one or more second dielectric resonators are physically coupled to the first side of the substrate to maintain fixed spatial relationships between the first exciter dielectric resonator and the one or more second dielectric resonators.

16. The microwave heating apparatus of claim 15, further comprising a ground plane, wherein the substrate is slidably engaged with the ground plane.

17. The microwave heating apparatus of claim 1, further comprising a conformal material covering the first exciter dielectric resonator and the one or more second dielectric resonators.

18. The microwave heating apparatus of claim 1, wherein the first exciter dielectric resonator and the one or more second dielectric resonators have a same geometrical shape and are of a same size.

19. The microwave heating apparatus of claim 1, wherein two or more of the first exciter dielectric resonator and the one or more second dielectric resonators have different geometrical shapes.

20. The microwave heating apparatus of claim 1, wherein two or more of the first exciter dielectric resonator and the one or more second dielectric resonators have different sizes.

21. The microwave heating apparatus of claim 1, wherein a number of dielectric resonators in the dielectric resonator antenna array is in a range of two to thirty.

22. The microwave heating apparatus of claim 1, wherein the solid state microwave energy source comprises:
an amplifier arrangement that includes a transistor with a transistor input and a transistor output, wherein the amplifier arrangement is configured to produce the excitation signal at a microwave frequency in a range of 2.3 gigahertz (GHz) to 2.6 GHz.

23. The microwave heating apparatus of claim 22, wherein the amplifier arrangement forms a portion of an oscillator sub-system that further comprises:
resonant circuitry along a feedback path between the transistor output and the transistor input, wherein a resonant frequency of the resonant circuitry is the microwave frequency.

24. A microwave heating apparatus comprising:
a chamber configured to contain a load, wherein the chamber is defined in part by a first chamber wall having an interior chamber-wall surface and an exterior chamber-wall surface;
a solid state microwave energy source;
a first dielectric resonator antenna that includes a first exciter dielectric resonator and a first feed structure in proximity to the first exciter dielectric resonator, wherein the first exciter dielectric resonator has a top surface and an opposed bottom surface, wherein the first feed structure is electrically coupled to the microwave energy source to receive a first excitation signal from the microwave energy source, and wherein the first exciter dielectric resonator is configured to produce a first electric field in response to the excitation signal provided to the first feed structure; and
one or more second dielectric resonators positioned adjacent to a sidewall and within a distance of the first exciter dielectric resonator to form a dielectric resonator antenna array, wherein the distance is selected so that each of the second dielectric resonators is closely capacitively coupled with the first exciter dielectric resonator when the excitation signal is provided, and wherein the distance is less than one fifth of a wavelength of a resonant frequency of the first exciter dielectric resonator.

25. The microwave heating apparatus of claim 24, wherein the chamber would be below cutoff in the absence of the dielectric resonator antenna array.

26. The microwave heating apparatus of claim 24, wherein a cross-sectional shape of the chamber is selected from a circle, an ellipse, and a rectangle.

27. The microwave heating apparatus of claim 24, wherein, when the excitation signal is provided, the first electric field includes a circumferential electric field, and wherein the first exciter dielectric resonator and the second dielectric resonators are arranged in a co-planar configuration so that a portion of the circumferential electric field directly impinges on the second dielectric resonators.

28. The microwave heating apparatus of claim 24, wherein the distance is less than one tenth of the wavelength of the resonant frequency of the first exciter dielectric resonator.

29. A method of operating a microwave system that includes a microwave generation module, the method comprising:
producing, by the microwave generation module, a first excitation signal that is conveyed to a first radio frequency (RF) feed structure, wherein the first RF feed structure is positioned in proximity to a first dielectric resonator;
producing, by the first dielectric resonator in response to the first excitation signal conveyed by the first RF feed structure, a first electric field that directly impinges upon a second dielectric resonator that is closely capacitively coupled to the first dielectric resonator and that is positioned adjacent to a sidewall and within a distance of less than one fifth of a wavelength of a resonant frequency of the first dielectric resonator; and
producing, by the second dielectric resonator in response to impingement of the first electric field, a second electric field, wherein the second electric field is directed toward a chamber that contains a near-field load.

30. The method of claim 29, further comprising:
producing a second excitation signal that is conveyed to a second RF feed structure, wherein the second RF feed structure is positioned in proximity to the first dielectric resonator, the second dielectric resonator, or a third dielectric resonator; and
producing, by the first, second, or third dielectric resonator in response to the second excitation signal, a third electric field.

31. The method of claim 30, wherein the first and second excitation signals are produced simultaneously or are phased.

32. The method of claim 30, wherein the first and second excitation signals have a substantially same frequency or different frequencies.

* * * * *